(12) United States Patent
Trakadis

(10) Patent No.: US 12,525,357 B2
(45) Date of Patent: Jan. 13, 2026

(54) SYSTEM FOR MANAGING GENETIC INFORMATION ASSOCIATED WITH A HUMAN GENOME OF A TARGET SUBJECT AND DISPLAYED VIA A GRAPHICAL USER INTERFACE (GUI)

(71) Applicant: John Trakadis, Montreal (CA)

(72) Inventor: John Trakadis, Montreal (CA)

(73) Assignee: TRAKADIS M.D. INC., Mont-Royal (CA)

( * ) Notice: Subject to any disclaimer, the term of this patent is extended or adjusted under 35 U.S.C. 154(b) by 242 days.

(21) Appl. No.: 18/526,328

(22) Filed: Dec. 1, 2023

(65) Prior Publication Data

US 2024/0105337 A1    Mar. 28, 2024

Related U.S. Application Data

(63) Continuation-in-part of application No. 17/951,415, filed on Sep. 23, 2022, now Pat. No. 11,768,648, which is a continuation-in-part of application No. 14/347,580, filed as application No. PCT/CA2012/000881 on Sep. 26, 2012, now abandoned.

(60) Provisional application No. 61/668,021, filed on Jul. 4, 2012, provisional application No. 61/562,110, filed on Nov. 21, 2011, provisional application No. 61/539,020, filed on Sep. 26, 2011.

(51) Int. Cl.
| | |
|---|---|
| *G16H 50/20* | (2018.01) |
| *G06F 21/60* | (2013.01) |
| *G16B 50/40* | (2019.01) |
| *G16H 70/60* | (2018.01) |

(52) U.S. Cl.
CPC .......... *G16H 50/20* (2018.01); *G06F 21/602* (2013.01); *G16B 50/40* (2019.02); *G16H 70/60* (2018.01)

(58) Field of Classification Search
CPC ...... G16H 50/20; G16H 70/60; G06F 21/602; G06F 3/14; G09G 5/14; G16B 50/40; G16B 20/00; G16B 20/20; G16B 50/00; G16B 50/30
See application file for complete search history.

(56) References Cited

U.S. PATENT DOCUMENTS

| | | | | |
|---|---|---|---|---|
| 10,896,741 B2 * | 1/2021 | Nguyen | .................. | G06N 5/04 |
| 11,705,230 B1 * | 7/2023 | Jain | ........................ | G16H 20/10 |
| | | | | 705/3 |

(Continued)

*Primary Examiner* — Vijay Shankar
(74) *Attorney, Agent, or Firm* — PRAXIS

(57) ABSTRACT

A computer implementable system manages genetic information associated with a human genome of a target subject and displayed via a graphical user interface (GUI). The target subject genetic information is encrypted. The system compares the clinical data of the target subject with clinical data in its database to provide a first ranking of possible genetic diseases. Then the genetic information of the target subject is compared to the genetic information in the database to re-rank via a weight score evaluation based on predetermined criteria thereby providing a second ranking of possible genetic diseases. Allowing a user to decrypt a portion or portions of the encrypted target subject genome that are related to the possible genetic diseases and blocking decryption of the rest of the genome. Providing access to the decrypted portions of the target subject genome via the GUI.

20 Claims, 11 Drawing Sheets

(56) References Cited

U.S. PATENT DOCUMENTS

| | | | |
|---|---|---|---|
| 11,901,083 B1* | 2/2024 | Jain | G16B 20/00 |
| 12,260,530 B2* | 3/2025 | Kumar Singh | G06T 5/60 |
| 2021/0104296 A1* | 4/2021 | Nguyen | G16B 40/30 |
| 2025/0157573 A1* | 5/2025 | Colombo | G16B 20/20 |

* cited by examiner

| Drug | Primary Effect Efficacy Weight Score | Secondary Effect | | | Total Weighted Score | Ranking |
|---|---|---|---|---|---|---|
| | | Unacceptable Secondary Effect Above Threshold (Major) Toxicity | Acceptable Secondary Effect Below Threshold | | | |
| | | | Undesirable Minor Toxicity | Desirable Secondary Effect | | |
| A | 5 | No | -3 | +3 | 5 | 2nd |
| B | 4 | No | -1 | +6 | 9 | 1st |
| C | 8 | Yes | 0 | +1 | nil | Unranked WARNING |
| D | 6 | No | -4 | +2 | 4 | 3rd |
| E | 3 | No | -1 | 0 | 2 | 4th |

FIG. 10

SYSTEM FOR MANAGING GENETIC INFORMATION ASSOCIATED WITH A HUMAN GENOME OF A TARGET SUBJECT AND DISPLAYED VIA A GRAPHICAL USER INTERFACE (GUI)

CROSS-REFERENCE TO RELATED APPLICATIONS

The present application is a continuation-in-parts application of U.S. patent application Ser. No. 14/347,580 filed on Mar. 26, 2014 which is a National Entry application of International Patent Application No. PCT/CA2012/000881 filed on Sep. 26, 2012 and claiming priority on U.S. Provisional Patent Application No. 61/539,020 filed on Sep. 26, 2011, U.S. Provisional Patent Application No. 61/562,110 filed on Nov. 21, 2011, and U.S. Provisional Patent Application No. 61/668,021 filed on Jul. 4, 2012 all of which are incorporated by reference herein in their entirety.

TECHNICAL FIELD

The present disclosure relates to a system for managing genetic information. More particularly, but not exclusively the present disclosure relates to a system for managing genetic information associated with a human genome of a target subject and displayed via a graphical user interface (GUI).

BACKGROUND

A variety of human genome analysis tools exist. These tools provide access to clinicians or third party users to the complete genomic data of a target subject without built in restrictions. Moreover, these systems do not provide for ral time GUI management by monitors such as the target subject whose genome is being analyzed or their representative.

Objects

An object of the present disclosure is to provide a computer implementable system for managing genetic information associated with a human genome of a target subject and displayed via a graphical user interface (GUI).

SUMMARY

In accordance with an aspect of the present disclosure, there is provided a computer implementable system for managing genetic information associated with a human genome of a target subject and displayed via a graphical user interface (GUI), the system comprising: a user device comprising a device controller with an associated memory, an input interface, and a display interface for displaying the GUI; a data storage medium having stored therein an encrypted genome or portions thereof of the target subject; a database having stored therein: (a) genetic diseases linked at least in part to at least one relevant region in the genome of the target subject and at least in part to at least one phenotypic characteristic, and (b) at least one reference genome or portions thereof; a system controller in communication with the user device and the database, the system controller having a processor with an associated memory of processor executable code for being executed by the system controller or for being downloaded into the memory of the user device controller to be executed thereby or to be executed synergistically by a combination of the system controller and the user device controller, wherein execution of the processor executable code by the system controller or by the user device controller or by the combination thereof synergistically provides for the system controller or the user device controller or the combination thereof with performing real time computer-implementable steps comprising: prompting a user via the GUI to input data related to assessed phenotypes of the target subject via the input interface; acquiring the input data related to the assessed phenotypes; accessing the encrypted genome or portions thereof of the target subject stored in the data storage medium; searching the database by automatically comparing the assessed phenotypes of the target subject with (a) in the database in order to provide one or more matches between the assessed phenotypes and a genetic disease stored in the database thereby providing in real time a first ranking list of possible genetic diseases, each possible genetic disease being related to at least one genetic variant indicative of that disease; identifying genetic variants in the encrypted genome or portions thereof of the target subject by automatically comparing it to (b) thereby providing a first ranking list of possible genetic diseases; simultaneously assigning an overall weight score to each of the identified genetic variants in the first ranking list based on predetermined criteria; adjusting the first ranking list of possible genetic diseases by a re-ranking thereof based on the assigned overall weight score; providing a second ranking list of possible genetic diseases based on the re-ranking of the first ranking, the second ranking comprising a list of possible genetic diseases above a predetermined overall weight score threshold; displaying via the GUI the second ranking list of possible genetic diseases and/or a visual representation of a portion or portions of the genome of the target subject that are related to the second ranking, wherein the second ranking list of possible genetic diseases are visually displayed to be differentiated in order of corresponding assigned overall weight score, wherein the visual representation of the portion or portions of the genome of the target subject that are related to the second ranking are visually displayed in order of corresponding overall weight score of the possible genetic diseases, providing for receiving an input command via the input interface for selective decryption of a portion or portions of the genome of the target subject; determining if the input command for selective decryption is for the portion or portions of the genome of the target subject that are related to the second ranking (Accessible Data) or that are not related to the second ranking (Confidential Data); decrypting the portion or portions of the genome of the target subject determined to be part of the Accessible Data when receiving the input command therefor; displaying the decrypted portion or portions of the genome of the target subject of the Accessible Data via the GUI; blocking decryption of the Confidential Data when receiving the input command therefor; and displaying via the GUI an indication that decryption is blocked when receiving the input command for decryption of the Confidential Data.

In an embodiment, the real time computer implementable steps further comprise: blocking any further input commands via the input interface and/or blocking the GUI following a predetermined threshold of input commands for decrypting the Confidential Data.

In an embodiment, the system further comprises a monitoring user device comprising a monitoring user device controller with an associated memory, a monitoring input interface, and a monitoring display interface for displaying a monitoring user interface (mGUI), the real time computer implementable steps further comprising: (i) displaying a message via the mGUI indicative of the received input command for decryption of the Confidential Data; (ii) prompting a target subject via the mGUI and following the displayed message in (i) to selectively input a command via the target subject input for: (i.1) establishing communication between the mGUI and the GUI; and/or (i.2) blocking any further input commands via the input interface and/or blocking the GUI; and (iii) executing the input command of (i.1) and/or (i.2) upon receipt thereof.

In an embodiment, the system further comprises a monitoring controller with an associated memory of processor executable code in operative communication with the system controller and/or the device controller, wherein execution of the processor executable code provides the monitoring controller to perform the computer implementable steps of: receiving a signal from the user device indicative of an input command for decrypting Confidential Data; responding to the indicative signal based on predetermined criteria stored in the memory of the monitoring controller, wherein responding comprises: inquiring by way of computer-generated communication with the user via the GUI the input command for decryption of the Confidential Data; determining based on user responses to the computer-generated inquiry in view of predetermined criteria stored in the memory of the monitoring controller whether decryption of the Confidential Data should proceed or not proceed; transmitting a signal to the system controller to allow the Confidential Data to be decrypted if it has been determined that the decryption should proceed or transmitting a signal to the system controller to continue to block decryption of the Confidential Data if it has been determined that decryption should not proceed.

In an embodiment, the monitoring controller further performs the computer implementable step of sending a security signal to the system controller when it has been determined that decryption of the Confidential Data should not proceed and based on predetermined security criteria stored in the memory of the monitoring controller wherein the security signal indicates to the system controller to execute a computer implementable security step.

In an embodiment, the real time computer implementable steps further comprise: blocking the encrypted genome or portions thereof of the target subject stored in the data storage medium from being copied on another data storage medium when receiving input commands therefor; and displaying a message that copying of the encrypted genome or portions thereof is blocked via the GUI when receiving a command therefor. In an embodiment, the real time computer implementable steps further comprise: blocking any further input commands via the input interface and/or blocking the GUI following a predetermined threshold of input commands for copying of the encrypted genome or portions thereof. In an embodiment, the system further comprises a monitoring user device comprising a monitoring controller with an associated memory, a monitoring input interface, and a monitoring display interface for displaying monitoring display graphical user interface (mGUI), the real time computer implementable steps further comprising: (i) displaying a message via the mGUI indicative of the received input command for copying the encrypted genome or portions thereof of the target subject on another storage medium; (ii) prompting a target subject via the mGUI and following the displayed message in (i) to selectively input a command via the target subject input for: (i.1) establishing communication between the mGUI and the GUI; and/or (i.2) blocking any further input commands via the input interface and/or blocking the GUI; and (iii) executing the input command of (i.1) and/or (i.2) upon receipt thereof.

In an embodiment, the system further comprises a monitoring controller with an associated memory of processor executable code in operative communication with the system controller and/or the device controller, wherein execution of the processor executable code provides the monitoring controller to perform the computer implementable steps of: receiving a signal from the user device indicative of an input command for copying the encrypted genome or portions thereof of the target subject stored in the data storage medium on another data storage medium; responding to the indicative signal based on predetermined criteria stored in the memory of the monitoring controller, wherein responding comprises: inquiring by way of computer-generated communication with the user via the GUI the input command for the copying; determining based on user responses to the computer-generated inquiry in view of predetermined criteria stored in the memory of the monitoring controller whether the copying should proceed or not proceed; transmitting a signal to the system controller to allow the copying to be executed if it has been determined that the copying should proceed or transmitting a signal to the system controller to block the copying from being executed if it has been determined that the copying should not proceed. In an embodiment, the monitoring controller further performs the computer implementable step of sending a security signal to the system controller when it has been determined that the copying should not proceed and based on predetermined security criteria stored in the memory of the monitoring controller wherein the security signal indicates to the system controller to execute a computer implementable security step.

In an embodiment, the real time computer implementable steps further comprise: displaying via the GUI a graphical representation of the human genome of a target subject comprising visually identified accessible portion or portions thereof related to the Accessible Data and visually identified confidential portions or portions thereof related to the Confidential Data, wherein the input command for decryption of the Accessible Data comprises selecting via the GUI the visually identified accessible portion or portions. In an embodiment, the input command for decryption of the Confidential Data comprises selecting via the GUI the visually identified confidential portion or portions.

In an embodiment, the real time computer implementable steps further comprise: prompting a user via the GUI to input a user identifier via the input interface in order for the system to identify the user based on a predetermined user list stored in the system memory; and monitoring user activity of the user.

In an embodiment, the real time computer implementable steps further comprise: providing for receiving an input command via the input interface regarding filtering criteria, wherein the filtering criteria comprises additional disease criteria, wherein the second ranking comprising the list of possible genetic diseases above the predetermined overall weight score threshold that include the additional disease characteristics.

In accordance with an aspect of the present disclosure, there is provided a computer implementable system for managing genetic information associated with a human genome of a target subject and displayed via a graphical user interface (GUI), wherein the genetic information modulates the target subject's response to one or more therapeutic drugs when administered thereto, the system comprising: a user device comprising a device controller with an associated memory, an input interface, and a display interface for displaying the GUI; a data storage medium having stored therein an encrypted genome or portions thereof of the target subject; a database having stored therein: (a) a list of therapeutic drugs, (b) a list of genetic information that modulates a human response to one or more of the therapeutic drugs in the list thereof, wherein the genetic information comprises a list of genetic variants and combinations thereof, wherein the human response comprises a list of primary therapeutic effects and secondary effects for each of the therapeutic drugs in the list thereof, wherein the human response is also dependent to human profile data; a system controller in communication with the user device and the database, the system controller having a processor with an associated memory of processor executable code for being executed by the system controller or for being downloaded into the memory of the user device controller to be executed thereby or to be executed synergistically by a combination of the system controller and the user device controller, wherein execution of the processor executable code by the system controller or by the user device controller or by the combination thereof synergistically provides for the system controller or the user device controller or the combination thereof with performing real time computer-implementable steps comprising: prompting a user via the GUI to input data related to candidate drugs for administration to the target subject via the input interface; acquiring human profile data related to the target subject; accessing the encrypted genome or portions thereof of the target subject stored in the data storage medium; searching the database by automatically comparing the candidate drugs with the list of therapeutic drugs in (a) in order to identify matches therebetween so as to provide a match between the list of genetic information in (b) and the candidate drug thereby identifying candidate genetic variants that will modulate the target subject's response to the candidate drugs; comparing the target subject genetic variants to the candidate genetic variants in order to identify matches therebetween so as to provide response modulating genetic variants of the target subject (Modulating Variants); determining the primary therapeutic effects and secondary effects modulated by the Modulating Variants for each of the candidate drugs based on the human profile data of the target subject; assigning weight scores to the determined primary therapeutic effect and secondary effects for each candidate drug based on the target subject's response to each of the candidate drugs as modulated by the Modulating Variants and additional predetermined criteria stored in the database; assigning an overall weight score to each of the candidate drugs based on the assigned weight scores of the determined primary therapeutic effects and secondary effects; ranking the candidate drugs based on the assigned overall weight scores; displaying via the GUI the ranking of the candidate drugs and a visual representation of a portion or portions of the genome of the target subject that are related to the Modulating Variants, wherein ranking of the candidate drugs are visually displayed to be differentiated in order of corresponding assigned overall weight score, providing for receiving an input command via the input interface for selective decryption of a portion or portions of the genome of the target subject; determining if the input command for selective decryption is for the portion or portions of the genome of the target subject that are related to the Modulated Variants of the ranked candidate drugs (Accessible Data) or that are not related to the Modulated Variants of the ranked candidate drugs (Confidential Data); decrypting the portion or portions of the genome of the target subject determined to be part of the Accessible Data when receiving the input command therefor; displaying the decrypted portion or portions of the genome of the target subject of the Accessible Data via the GUI; blocking decryption of the Confidential Data when receiving the input command therefor; and displaying via the GUI an indication that decryption is blocked when receiving the input command for decryption of the Confidential Data.

In an embodiment, the secondary effects comprise major secondary effects and minor secondary effects, wherein the computer implementable steps further comprise distinguishing between the major and minor secondary effects, wherein identification of a major secondary effect for a given one of the candidate drugs causes that given one of the candidate drugs to be removed from the ranking. In an embodiment, the system further comprises a monitoring user device comprising a monitoring controller with an associated memory, a monitoring input interface, and a monitoring display interface for displaying monitoring display graphical user interface (mGUI), the real time computer implementable steps further comprising: communicating the minor secondary effects via the mGUI; prompting via the mGUI for input commands via the input interface providing for selecting between desirable and undesirable minor secondary effects; wherein the assigning of weight scores to the secondary effects is based on the selected desirable and undesirable minor secondary effects.

In accordance with an aspect of the present disclosure, there is provided a computer implementable system for managing genetic information associated with a human genome of a target subject and displayed via a graphical user interface (GUI), the system comprising: a user device comprising a device controller with an associated memory, an input interface, and a display interface for displaying the GUI; a data storage medium having stored therein an encrypted genome or portions thereof of the target subject (target genetic profile); a database having stored therein a plurality of patient profiles, wherein each of the patient profiles comprising a clinical profile and a genetic profile; a system controller in communication with the user device and the database, the system controller having a processor with an associated memory of processor executable code for being executed by the system controller or for being downloaded into the memory of the user device controller to be executed thereby or to be executed synergistically by a combination of the system controller and the user device controller, wherein execution of the processor executable code by the system controller or by the user device controller or by the combination thereof synergistically provides for the system controller or the user device controller or the combination thereof with performing real time computer-implementable steps comprising: prompting a user via the GUI to input data related to a target clinical profile of target of the target subject via the input interface; acquiring the input data related to the target clinical profile; accessing the encrypted genome or portions thereof of the target subject stored in the data storage medium; automatically comparing the target clinical profile with the clinical profile of the patients stored in the database in order to provide first clusters of the patient clinical profiles that have a degree of similarity above a predetermined threshold with the target clinical profile, each of the first clusters having respective clinical profiles of the patients with a degree of similarity therebetween, each of the first clusters being ranked (first ranking) according to their degree of similarity with the target clinical profile; automatically comparing the target genetic profile to the genetic profiles of the patients stored in the database in order to provide second clusters of the patient genetic profiles within the first clusters that have a degree of similarity above a predetermined threshold with the target genetic profile, each of the second clusters having respective genetic profiles of the patients with a degree of similarity therebetween, each of the second clusters being ranked (second ranking) according to their degree of similarity with the target genetic profile, each of the second clusters being related to a portion or portions of the genome of the target subject; displaying via the GUI the second clusters and/or a visual representation of the portion or portions of the genome of the target subject related to the second clusters, wherein the second ranking is visually displayed to be differentiated, wherein the visual representation of the portion or portions of the genome of the target subject that are related to the second ranking are visually displayed in ranking order, providing for receiving an input command via the input interface for selective decryption of a portion or portions of the genome of the target subject; determining if the input command for selective decryption is for the portion or portions of the genome of the target subject that are related to the second clusters (Accessible Data) or that are not related to the second clusters (Confidential Data); decrypting the portion or portions of the genome of the target subject determined to be part of the Accessible Data when receiving the input command therefor; displaying the decrypted portion or portions of the genome of the target subject of the Accessible Data via the GUI; blocking decryption of the Confidential Data when receiving the input command therefor; and displaying via the GUI an indication that decryption is blocked when receiving the input command for decryption of the Confidential Data.

In an embodiment, the second clusters are related to respective candidate diseases.

In an embodiment, the second clusters are related to respective candidate therapeutic drugs.

In accordance with an aspect of the present disclosure, there is provided a computer implementable system for managing genetic information associated with a human genome of a target subject and displayed via a graphical user interface (GUI), the system comprising: a user device comprising a device controller with an associated memory, an input interface, and a display interface for displaying the GUI; a data storage medium having stored therein an encrypted genome or portions thereof of the target subject (target genetic profile); a database having stored therein a plurality of patient profiles, wherein each of the patient profiles comprising a clinical profile and a genetic profile; a system controller in communication with the user device and the database, the system controller having a processor with an associated memory of processor executable code for being executed by the system controller or for being downloaded into the memory of the user device controller to be executed thereby or to be executed synergistically by a combination of the system controller and the user device controller, wherein execution of the processor executable code by the system controller or by the user device controller or by the combination thereof synergistically provides for the system controller or the user device controller or the combination thereof with performing real time computer-implementable steps comprising: prompting a user via the GUI to input data related to a target clinical profile of target of the target subject via the input interface; acquiring the input data related to the target clinical profile; accessing the encrypted genome or portions thereof of the target subject stored in the data storage medium; automatically comparing the target clinical and genetic profiles with the clinical and genetic profile of the patients stored in the database in order to provide clusters of the patient clinical and genetic profiles that have a degree of similarity above a predetermined threshold with the target clinical and genetic profile, each of the clusters having respective clinical and genetic profiles of the patients with a degree of similarity therebetween, each of the clusters being ranked according to their degree of similarity with the target clinical and genetic profiles; displaying via the GUI the clusters and/or a visual representation of the portion or portions of the genome of the target subject related to the clusters, wherein the ranking is visually displayed to be differentiated, wherein the visual representation of the portion or portions of the genome of the target subject that are related to the clusters are visually displayed in ranking order, providing for receiving an input command via the input interface for selective decryption of a portion or portions of the genome of the target subject; determining if the input command for selective decryption is for the portion or portions of the genome of the target subject that are related to the second clusters (Accessible Data) or that are not related to the second clusters (Confidential Data); decrypting the portion or portions of the genome of the target subject determined to be part of the Accessible Data when receiving the input command therefor; displaying the decrypted portion or portions of the genome of the target subject of the Accessible Data via the GUI; blocking decryption of the Confidential Data when receiving the input command therefor; and displaying via the GUI an indication that decryption is blocked when receiving the input command for decryption of the Confidential Data.

In accordance with an aspect of the disclosure, there is provided a computer implemented system for rearranging a computer generated list of genetic diseases for a target subject on a graphical user interface of a computer system and for managing information displayed via the graphical user interface associated with a human genome of the target subject comprising identified portion or portions thereof related to a genetic disease in the target subject for use in a treatment of an undiagnosed genetic disease in the target subject, wherein the treatment requires access to the identified portion or portions for analysis thereof, the system providing for determining and ranking possible genetic diseases of the target subject based on assessed phenotypes thereof, the system providing access to the portion or the portions of the genome related to potential genetic diseases based on the ranking thereof while blocking access to other genomic data of the target subject, the system comprising: a client device having: graphical user interface for displaying the possible genetic diseases and portion or portions of the target subject genome related to the possible genetic diseases; a user input interface; and a data storage medium having stored therein the encrypted genome or portions thereof of the target subject; a database having stored therein: (a) genetic diseases linked at least in part to at least one relevant region in the genome of the target subject and at least in part to at least one phenotypic characteristic, and (b) at least one reference genome or portions thereof; a controller having a processor and an associated memory having stored therein processor executable code, the controller being in operative communication with the database and the client device, wherein the user interface enables the system user to input data and to operate the controller in order to cause the processor to execute the processor executable code stored in the associated memory; wherein the processor executable code when executed by the processor causes the controller to automatically execute real time computational steps of: acquiring via the user input interface data input related to the assessed phenotypes, the assessed phenotypes being selected from the group consisting of clinically assessed phenotypes, specific profiles in the transcriptome of the target subject, specific profiles in the metabolome of the target subject, changes in the transcriptome of the target subject, changes in the metabolome of the target subject; accessing the encrypted genome or portions thereof of the target subject stored in the data storage medium without allowing the system user or a third party access to the encrypted genome or portions thereof; searching the database by automatically comparing the assessed phenotypes of the target subject with (a) in the database in order to provide one or more matches between the assessed phenotypes and a genetic disease stored in the database thereby providing in real time a first ranking list of possible genetic diseases, each possible genetic disease being related to at least one genetic variant indicative of that disease; identifying genetic variants in the encrypted genome or portions thereof of the target subject by automatically comparing it to (b) without allowing the system user or the third party access to the identified genetic variants; displaying via the user graphical interface the first ranking list of possible genetic diseases; wherein a user input command via the user interface causes the controller to adjust the displayed first ranking list of possible genetic diseases by a re-ranking thereof in order to provide a second ranking of possible genetic diseases by executing real time computational steps of: displaying via the graphical user interface an interactive checklist to the user the allow the user to selectively adjust parameters of weight score assignment via user input commands; simultaneously assigning an overall weight score to each of the identified genetic variants in the first ranking list based on the adjusted parameters and computational weighting criteria steps performed automatically in real time and comprising: determining whether the identified genetic variant is known to cause a genetic disease or not, wherein information regarding known genetic variants associated to genetic diseases is stored in the associated memory of the controller or accessible thereto via a system database therefor, assigning a score to the identified genetic variant if it is known to cause the genetic disease that is greater than a score assigned to the genetic variant that is not known to cause the genetic disease; determining the strength of the association of an identified genetic variant with a studied trait by using a statistical method to analyze the cosegregation of the identified genetic variant with a disease at a population and/or a family level, the statistical method being selected from the group consisting of: a Bayesian analysis, an LOD score analysis, a TDT analysis and any combination thereof, wherein the information related to the disease at a population and/or family level is stored in the associated memory of the controller or accessible thereto via a system database therefor, assigning a score that is proportional to the strength of the association; and automatically providing an overall weight score for each genetic variant based on the weight attributed to each of the assigned scores, wherein the weight attributed to each of the assigned scores is stored within the associated memory of the controller or accessible thereto via a system database therefor; adjusting the first ranking list of possible genetic diseases by a re-ranking thereof based on the assigned overall weight score thereby providing the second ranking list of possible genetic diseases; displaying via the user graphical interface the second ranking list of possible genetic diseases, the possible genetic diseases displayed in order of corresponding assigned overall weight; and restricting user access to a portion or portions of the genome of the target subject related related only to the second ranking list of possible genetic diseases; wherein accessing a portion or portions of the genome of the target subject related only to the second ranking list of possible genetic diseases allow for subsequently treating the determined genetic disease.

In an embodiment, the database has stored therein information related to a plurality of other subjects, wherein the information comprises: one or more previously assessed phenotypic characteristics associated with each one of the other subjects wherein the one or more previously assessed phenotypic characteristics are indicative of one or more possible genetic diseases; and one or more genetic variants associated with each one of the other subjects and previously determined by comparing the genome of each one of the other subjects to the reference genome, wherein the one or more genetic variants associated with each one of the other subjects are indicative of one or more possible genetic diseases; wherein searching the database by automatically comparing the assessed phenotypes of the target subject with (a) in the database using the assessed phenotypes in order to provide one or more matches between the assessed phenotypes and a genetic disease comprises the computational steps of: searching the database by automatically comparing the assessed phenotypes of the target subject against the phenotypic characteristics of the other subjects to provide one or more matches between the target subject and the other subjects based on the phenotypic similarity therebetween which are indicative of possible genetic diseases; wherein providing a first ranking list of possible genetic diseases comprises the computational step of: providing a first ranking of the one or more matches between the target subject and the one or more of the other subjects based on the degree of phenotypic similarity therebetween; wherein simultaneously assigning an overall weight score to each of the identified genetic variant in the first raking list comprises the computational step of: searching the database by automatically comparing the identified genetic variants of the target subject against the genetic variants of the other subjects in the first ranking to provide one or more matches between the target subject and the other subjects of the first ranking based the similarity of the genetic variants therebetween which is indicative of possible genetic diseases; wherein adjusting the first ranking list of possible genetic diseases based on the overall weight score comprises: re-ranking the first ranking based on the degree of similarity of the genetic variants between the target subject and the other subjects of the first ranking to provide the second ranking list of possible genetic disease.

In an embodiment, the processor executable code when executed by the processor causes the controller to execute further computational steps of: automatically and simultaneously assigning in real time an overall weight score to each of the identified genetic variants in the first ranking list based on at least one further computational weighting criteria step performed automatically and in real time and selected from the group consisting of: determining the frequency of the identified genetic variant in the database of genetic diseases, assigning a score that correlates to the frequency or that is based on the frequency, wherein scores correlating to the frequency are selected from the group consisting of scores being directly proportional to the frequency and scores being inversely proportional to the frequency, wherein scores based on the frequency comprise predetermined scores having been assigned to predetermined frequencies stored in the memory of the controller or accessible thereto via a system database; assigning a score based on the type of identified genetic variant, wherein predetermined scores have been assigned to predetermined types of genetic variants and stored in the associated memory of the controller or accessible thereto via a system database therefor; assigning a score based on whether or not the identified genetic change is present in a gene which is part of a cellular pathway already known to be involved in the pathophysiology of the assessed phenotype, wherein information regarding the known gene being part of the cellular pathway involved in the pathophysiology of the assessed phenotype is stored in the associated memory of the controller or accessible thereto via a system database therefor and assigning a score thereto that is greater than the score assigned to a gene that is not part of a cellular pathway involved in the pathophysiology of the assessed phenotype; and any combination thereof.

In an embodiment, the processor executable code when executed by the processor causes the controller to execute further computational steps of: acquiring in real time via the user interface data input related a disease present in other family members of the target subject; and automatically and simultaneously assigning in real time an overall weight score to each of the identified genetic variants in the first ranking list based on at least one further computational weighting criteria step performed automatically and in real time and selected from the group consisting of: assigning a score based on whether the identified genetic variant segregates with a disease present in other family members, wherein the score assigned to the identified genetic variant segregating with a disease present in other family members is higher than the score assigned to the identified genetic variant that does not segregate with a disease present in other family members; assigning a score based on whether the identified genetic variant segregates with a disease present in at least one other tissue of the target subject, wherein the score assigned to the identified genetic variant segregating with a disease present in at least one other tissue of the target subject is higher than the score assigned to the identified genetic variant that does not segregate with a disease present in at least one other tissue of the target subject; assigning a score based on the evolutionary conservation of the identified genetic variant, wherein information related to the evolutionary conservation of the identified genetic variant is stored in the associated memory of the controller or accessible thereto via a system database therefor, wherein predetermined scores have been assigned to predetermined levels of conservation of the identified genetic variants and stored in the associated memory of the controller or accessible thereto via a system database therefor; assigning a score based on the pattern of inheritance within the family history of the target subject, wherein the information related to the pattern of inheritance is acquired by the controller via user interface data input and stored in the associated memory of the controller or accessible thereto via a system database therefor, wherein predetermined scores have been assigned to predetermined patterns of inheritance and stored in the associated memory of the controller or accessible thereto via a system database therefor; and any combination thereof.

In an embodiment, the processor executable code when executed by the processor causes the controller to execute further computational steps of: acquiring in real time via the user interface data input related a disease present in other family members of the target subject; and automatically and simultaneously assigning in real time an overall weight score to each of the identified genetic variants in the first ranking list based on at least one further computational weighting criteria step performed automatically and in real time and selected from the group consisting of: assigning a score based on whether the identified genetic variant segregates with a disease present in other family members, wherein the score assigned to the identified genetic variant segregating with a disease present in other family members is higher than the score assigned to the identified genetic variant that does not segregate with a disease present in other family members; assigning a score based on whether the identified genetic variant segregates with a disease present in at least one other tissue of the target subject, wherein the score assigned to the identified genetic variant segregating with a disease present in at least one other tissue of the target subject is higher than the score assigned to the identified genetic variant that does not segregate with a disease present in at least one other tissue of the target subject; assigning a score based on the evolutionary conservation of the identified genetic variant, wherein information related to the evolutionary conservation of the identified genetic variant is stored in the associated memory of the controller or accessible thereto via a system database therefor, wherein predetermined scores have been assigned to predetermined levels of conservation of the identified genetic variants and stored in the associated memory of the controller or accessible thereto via a system database therefor; assigning a score based on the pattern of inheritance within the family history of the target subject, wherein the information related to the pattern of inheritance is acquired by the controller via user interface data input and stored in the associated memory of the controller or accessible thereto via a system database therefor, wherein predetermined scores have been assigned to predetermined patterns of inheritance and stored in the associated memory of the controller or accessible thereto via a system database therefor; and any combination thereof.

Other objects, advantages and features of the present disclosure will become more apparent upon reading of the following non-restrictive description of non-limiting illustrative embodiments thereof, given by way of example only.

BRIEF DESCRIPTION OF THE DRAWINGS

In the appended drawings, where like reference numerals denote like elements throughout and in where:

FIG. 10 is a schematic table of the therapeutic drug ranking regarding target subject response thereto as modulated by genetic variants of the target subject, drug ranking is performed by the system of FIG. 4 in accordance with a non-restrictive illustrative embodiment of the present disclosure;

DETAILED DESCRIPTION OF ILLUSTRATIVE EMBODIMENTS

Figure 1:
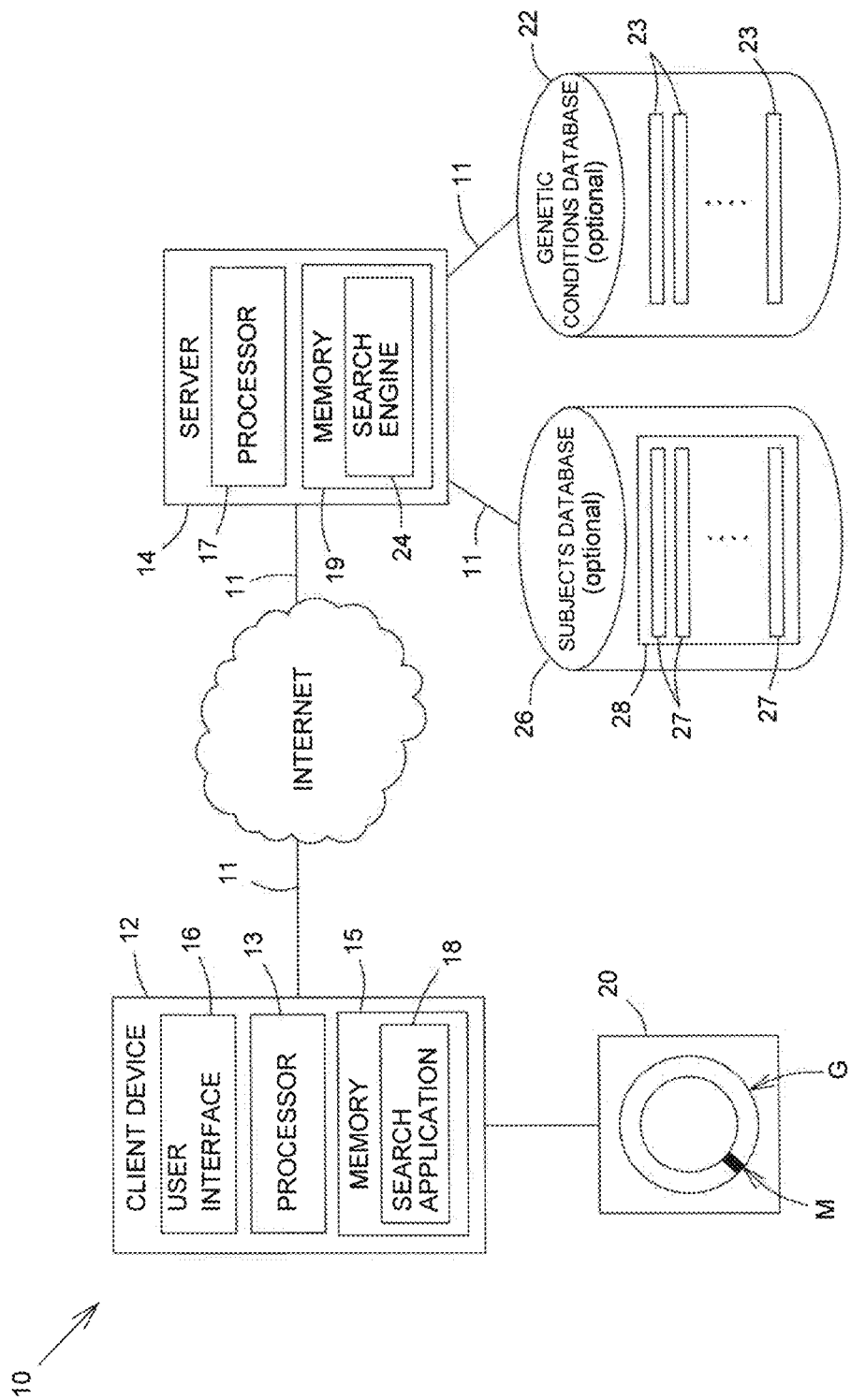
FIG. 1 is a schematic representation of the genetic trait search system in accordance with an illustrative embodiment of the present disclosure.

Generally stated, in accordance with an embodiment there is provided methods and systems of ranking a plurality of possible genetic conditions of a target subject related to assessed phenotypes of this subject comprise respective databases and search steps to provide the ranking. The genome of the target subject is analyzed, encrypted and changes are identified without providing user access to the changes. A database comprising genetic conditions linked at least in part to at least one relevant region in the genome of the subject and at least in part to at least one phenotypic characteristic. This database is searched based on the assessed phenotypes thereby providing a first ranking of possible genetic conditions for a given target subject, each genetic condition being related to at least one genetic change indicative of that condition. Weight scores are assigned to each of the identified changes based on predetermined criteria in order to adjust the first ranking and provide a second ranking of possible genetic conditions. A subjects database of other subjects comprises for each other subject, one or more phenotypic characteristics and the encrypted genome, wherein genetic changes in at least one relevant region in the encrypted genome are indicative of a possible genetic condition or conditions. The subject's database is searched for both phenotypic similarity and similarity of the genetic changes by respectively comparing the assessed phenotypes and the changes in the encrypted genome against the data in the subjects database. The target subject is respectively matched with one or more of the other subjects based on the phenotypic similarity therebetween and on the similarity of the genetic changes therebetween respectively. The matches are respectively ranked based on their respective degree of similarity. Depending on which set of matches was ranked first the other set will adjust the first ranking to provide a second ranking of possible genetic conditions since a given match in the second ranking is indicative of the possibility that the target subject shares the same genetic condition or conditions with the matched other subject.

Generally stated, in accordance with an embodiment, there is provided a method and a system of ranking a plurality of possible genetic conditions of a subject related to assessed phenotypes of this subject. A database comprises genetic conditions linked at least in part to at least one relevant region in the genome of the subject and at least in part to at least one phenotypic characteristic. The system also includes a processor which allows for performing the steps of the method. The genome of the subject is analyzed which can include sequencing this genome. The genome of the subject is then encrypted and it is compared to a reference genome so that the changes such as variants can be identified by the processor but without providing user access to the identified changes. The processor provides for automatically assigning weight scores to each of the identified changes based on predetermined criteria. Then the database is searched based on the assessed phenotypes thereby providing a first ranking of possible genetic conditions, each genetic condition being related to at least one genetic change indicative of that condition. This first ranking is adjusted based on the assigned weight scores. A second ranking of possible genetic conditions based on this adjustment is provided and this is accessible by the user via a user interface for example.

Generally stated, in accordance with an embodiment there is provided a method and a system for f ranking a plurality of possible genetic conditions of a target subject related to assessed phenotypes. A database of other subjects comprises for each other subject, one or more phenotypic characteristics and the encrypted genome, wherein genetic changes in at least one relevant region in the encrypted genome are indicative of a possible genetic condition or conditions. The system includes a processor which provides for performing the steps of the method. The genome of the subject is analyzed which can include sequencing this genome. The genome of the subject is then encrypted and it is compared to a reference genome so that changes such as variants can be identified by the processor but without providing user access to the identified changes. The database is searched for both phenotypic similarity and similarity of the genetic changes. Therefore, the database is searched by comparing the assessed phenotypes of the target subject against the phenotypic characteristics of the other subjects then matching the target subject with one or more of the other subjects based on the phenotypic similarity therebetween and providing a ranking of the matches between the target subject and the one or more of the other subjects based on the degree of phenotypic similarity. The database is also searched by comparing the changes in the encrypted genome of the target subject against the encrypted genomes of the other subjects then matching the target subject with the one or more of the other subjects based on the similarity of the genetic changes therebetween and providing a ranking of the matches between the target subject and the one or more of the other subjects based on the degree of the similarity of the genetic changes therebetween. Either one of these rankings (i.e. phenotypic similarity or similarity of the genetic changes) can be a first ranking. With the second set of matches (i.e. phenotypic similarity or similarity of the genetic changes) providing a second ranking by adjusting the first ranking based on the degree of similarity of the second set of matches. In this way, there is provided a ranking of the possible genetic conditions of the target subject in accordance to the second ranking, wherein a given match in the second ranking is indicative of the possibility that the target subject shares the same genetic condition or conditions with the matched other subject. The system provides for the foregoing results to be communicated to the user via a user interface.

Generally stated and in accordance with an embodiment of the present disclosure, there is provided herein a system and associated method allowing for searching regularly updated databases which include phenotypically and genetically well characterized diseases with specific keywords which form the basis for ranking the results as is known in the art, yet with the addition of taking into consideration the patient's mutations identified by genome/exome sequencing when ranking the results. In an embodiment, the system and associated method use an impact factor that corresponds to the level of certainty for the pathogenic (disease-causing) role of the mutation thereby appropriately adjusting the ranking of the search results based on this impact or weight factor without the physician having knowledge of the exact mutations identified by genome/exome sequencing.

In an embodiment, the genome/exome sequencing data of a patient is encrypted. In an embodiment, there is provided a method of analyzing this encrypted data in tandem with searching a database. Different mutations are assigned a different weight based on pre-set criteria which are integrated in the search application algorithm. Such criteria are typically used in the clinical evaluation of any identified variant that is found after genetic testing. The ranking of any given diagnosis is adjusted based on whether a pertinent genetic change was found in the target subject by genome/exome sequencing at the area of the genome (coding or non-coding region) known to cause or predispose to the respective/corresponding genetic disease.

In practice, the clinician does not need to look at the genome/exome sequencing results. In an embodiment the clinician does not have access to these results as they remain encrypted providing only the patient with full access to this confidential data. The foregoing provides several advantages; for example, consent is simplified as the patient does not need to discuss with the clinician which portions of the genome are to be sequenced. Consent will be obtained to explore the genetic causes explaining the phenotype/disease for which the patient is consulting the physician. This also simplifies counseling patients after results are obtained since counseling is focused on the disease at question. This way privacy and the principles of patient autonomy, non-maleficence, and informed consent are respected. Nevertheless, in special cases in which the clinician would need to have access to the encrypted data and the specific mutations therein a more elaborate counseling session with the proper consent is also provided by the present disclosure.

In one embodiment, the sequencing results are stored on a data storage medium, which may be, for example, a flash memory, USB key, CD, DVD and the like or any combination thereof, accessed either locally or remotely, for example on a cloud configuration. Furthermore, access to the data storage medium may be password protected.

The clinician uses this data storage medium to temporarily and anonymously upload the encrypted data to the search engine. In an embodiment, a BLAST (Basic Local Alignment Search Tool) or like tool search is performed. In bioinformatics, a BLAST is an algorithm for comparing primary biological sequence information, such as the amino-acid sequences of different proteins or the nucleotides of DNA sequences. A BLAST search enables a researcher to compare a query sequence with a library or database of sequences, and identify library sequences that resemble the query sequence above a certain threshold. Typically, the clinician enters a DNA sequence in a query box and the closest matched sequences appear in order of percentage of similarity. Similar available tools, such as BWA (bio-bwa.sourceforge.net) which are used in the analysis of exome sequencing data are useful.

The patient is provided with the option of allowing the clinician to store the data for future clinical research or reference or to destroy the data once used.

In an embodiment, the present disclosure provides for genome/exome sequencing to be used as a screening test and not necessarily as a clinical diagnostic test. With this approach a clinical genetic test is still used to confirm or rule out the disease which the physician suspects as most likely. A non-limiting object of this method is not to rule out a disease by using genome/exome sequencing but rather to increase the diagnostic yield of a clinical evaluation in a more cost-effective fashion and to decrease the time to diagnosis. This method provides a better predictive value for known syndromes as compared to conventional approach and increases diagnostic yield. For the remaining unresolved cases, the clinician needs to resort back to conventional approaches thereby reducing false negatives as long as qualified medical geneticists perform the evaluation, at least in the early stages of medical genomics, until other health professionals are adequately educated regarding its value, limitations, and appropriate clinical use.

Conventional approaches often require multiple clinical visits and multiple genetic tests before a molecular diagnosis is reached. Each clinical genetic test is often very expensive. The present disclosure, which follows the existing "phenotype-first" medical model, provides for saving resources by better prioritizing the genes to be tested in a clinical lab. As the cost of genome/exome sequencing is exponentially decreasing, the present method is overall efficient from a resource, time and personnel point of view both in the clinic and the laboratory. Nevertheless, the clinician remains responsible for identifying, and clinically prioritizing testing for, the clinically suspected syndromes by using current clinical testing modalities to confirm a suspected diagnosis even if it was not the first hit in the search list.

The present disclosure simply provides an extra tool at the clinician's disposal to make the foregoing assessment thus reducing cost and time. Its limitations are minimized as long as qualified personnel performs the evaluation since for the remaining unresolved cases one needs to resort back to conventional approaches. This reduces false negatives, as well as, accounts for other known genetic explanations (e.g. epigenetic changes) not accounted for by exome/genome sequencing.

Given that the clinician does not have access to all the mutations of the patient under evaluation, obtaining informed consent is simplified and remains feasible after ordinary counselling. The patient only needs to consent that the clinician can explore the genetic causes which can potentially explain the specific phenotype/medical-issue at hand. This approach also simplifies counselling patients after results are obtained since counselling is focused on the disease in question, which is identical to current practice. No unwanted or unrelated results will become evident. The clinical terms entered in the search are selected based on the diseases of interest. Increased predisposition to cancer could still be identified when evaluating a child for a different presentation (e.g. cognitive deficits and skeletal findings) but this is only in the context of the clinical evaluation (e.g. NF1 mutations in the case of the "developmental delay AND skeletal findings" leading to Neurofibromatosis which is associated with specific well-documented malignancies). Preventing or optimizing management for such complications associated with a given genetic diagnosis is already part of the geneticist's responsibility.

Of course, in the event that the clinician is mandated to actively analyze the raw data, a special counseling session can be conducted to discuss all the potential challenges and findings. If a physician wants to actively analyze the raw data, a session with specialized counseling ensuring informed consent is provided.

With reference to the appended Figures, non-restrictive illustrative embodiments will be herein described so as to further exemplify the disclosure only and by no means limit the scope thereof.

Referring to FIG. 1, the genetic trait search system 10 generally comprises one or more client device 12, a server 14, a data storage medium 20 and either a genetic conditions database 22 or a subjects database 26, which are interconnected via various connections 11 (locally or remotely) such as, for example, Ethernet (broadband, high-speed), wireless WiFi, cable Internet, satellite connection, LAN, WAN, serial connection, cellular or satellite network, etc.

The client device 12 includes a user interface 16, for example a display and keyboard, a processor 13 and an associated memory 15 having stored therein a search application The server 14 includes a processor 17 and an associated memory 19 having stored therein a search engine 24.

The data storage medium 20 in the illustrative embodiment is in the form of a DVD or a cloud configuration to give but two non-limiting examples, which includes the previously sequenced genome/exome G of a patient in an encrypted format and is accessed by the processor 13 executing the search application 18.

The genetic conditions database 22 is configured to store therein data 23 including known genetic conditions such as diseases with a genetic component (such as genetic syndromes) and associated relevant phenotypic characteristics and genetic regions/areas (loci) in the genome such as for example genes. Optionally, the database 22 can include under each gene listed the known variants of that gene. Optionally these variants can be classified in different categories e.g. known pathogenic (i.e. known disease causing) versus not-known pathogenic to give but two non-limiting example.

The subjects database 26 is configured to store therein, for a number of subjects 28, data 27 including one or more phenotypic characteristics for each subject 28 and the encrypted genome for each subject 28, wherein genetic changes in at least one relevant region in the encrypted genome of each subject 28 are indicative of a possible genetic condition or conditions.

In some cases, the subjects database 26 is configured to store therein, for a number of subjects 28, data 27 including the encrypted genome of each subject 28 and the assessed phenotypic characteristics of each subject 28 which are at least in part associated with genetic conditions and associated genetic loci in the genome of the given subject 28.

The search engine 24 is executed by the processor 17 to provide for searches of either the genetic conditions database 22 or the subjects database 26, conducted by the user through user interface 16 using the search application 18 and information provided by the data storage medium 20.

It is to be understood that although throughout the disclosure reference is made to separate client device 12, server 14, data storage medium 20, genetic conditions database 22 and subjects database 26, these may be implemented on one or more physical devices and may also be combined. It is to be further understood that the databases 22 and 26 may equally be implemented by a data structure within a computer memory.

Figure 2:
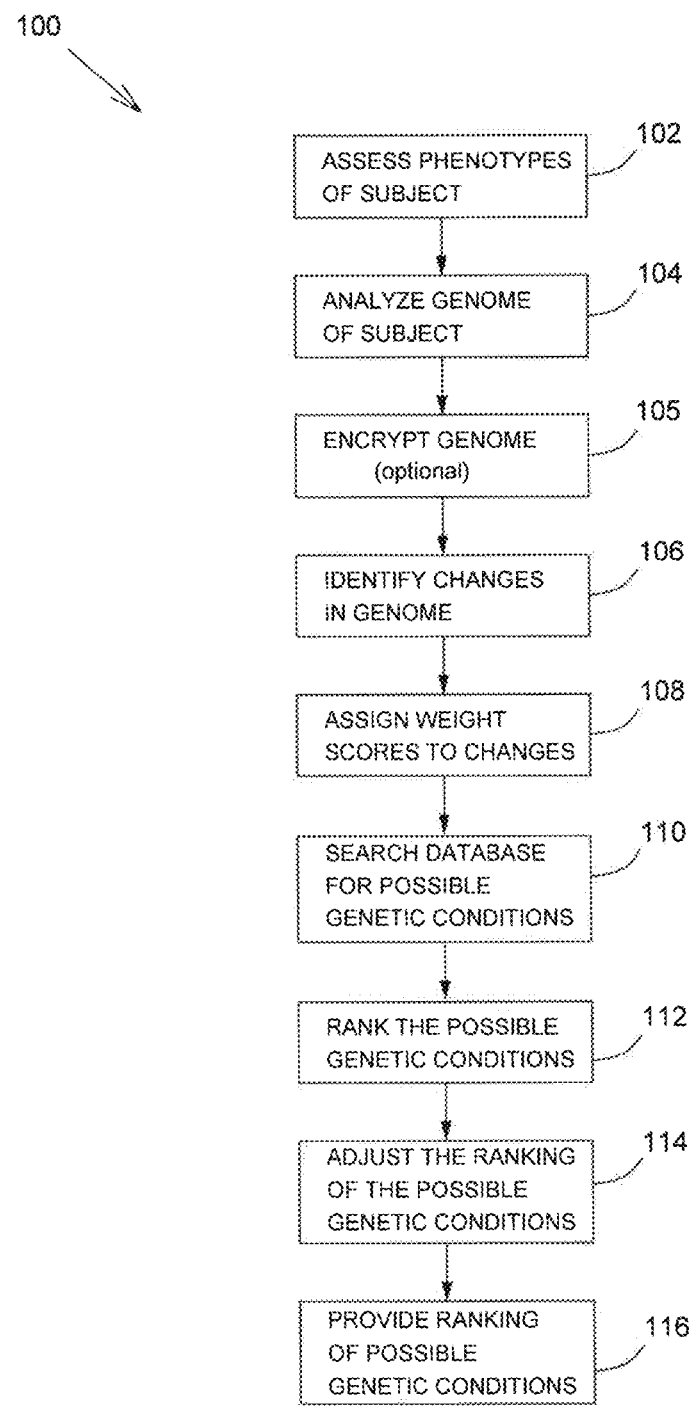
FIG. 2 is a flow diagram of an illustrative example of genetic trait search procedure executed by the genetic trait search system of FIG. 1 using the genetic conditions database 22.

Referring to FIG. 2, there is shown a flow diagram of an illustrative example of the genetic trait search procedure 100 used by the genetic trait search system 10 using the genetic conditions database 22. The steps of the procedure 100 are indicated by blocks 102 to 116.

The procedure 100 starts at block 102 where the phenotypes of a subject are assessed.

At block 104, the genome of the subject, for example from the data storage medium 20, is analyzed and optionally, at block 105, the genome of the subject is encrypted in order to ensure privacy.

At Block 106, changes in the (optionally encrypted) analyzed genome are identified by comparing it to a reference genome.

The clinician has access to the genomic data as part of the analysis but not the changes which are automatically identified by being compared to a reference genome without providing the user access thereto. I At block 108, weight scores are assigned to each genomic change identified at block 106, the weight scores being based on predetermined criteria.

Then, at block 110, the genetic conditions database 22 is searched, via the search engine 24, using the assessed phenotypes of the subject from block 102, in order to identify possible genetic conditions, each genetic condition being related to at least one genomic change, identified at block 106, indicative of that condition.

At block 112, the identified possible genetic conditions are ranked based on degree of phenotypic similarity, for example the number of common phenotypic features.

Then, at block 114, the ranking of the possible genetic conditions is adjusted using the weight scores, assigned at block 108, for each genomic change linked to the possible genetic condition.

Finally, at block 116, a ranking of possible genetic conditions is provided via the user interface 16.

It should be noted that blocks 104, 105, 106 and 108 may be performed prior to block 102. There may be cases, for example, where the genome of the patient has already been sequenced at birth prior to any detection of clinically significant phenotypes.

It should be further noted that in embodiment procedure 100 may be automated until after block 114 to ensure the privacy of the subject. Accordingly, the physician would have his access restricted to the genetic areas corresponding to the ones related to the genetic conditions provided by block 114. In practice, there may be some access to the genomic data before the block 114 in order to, for example, manipulate the data and "clean it". However, no access to the variants is provided.

Figure 3:
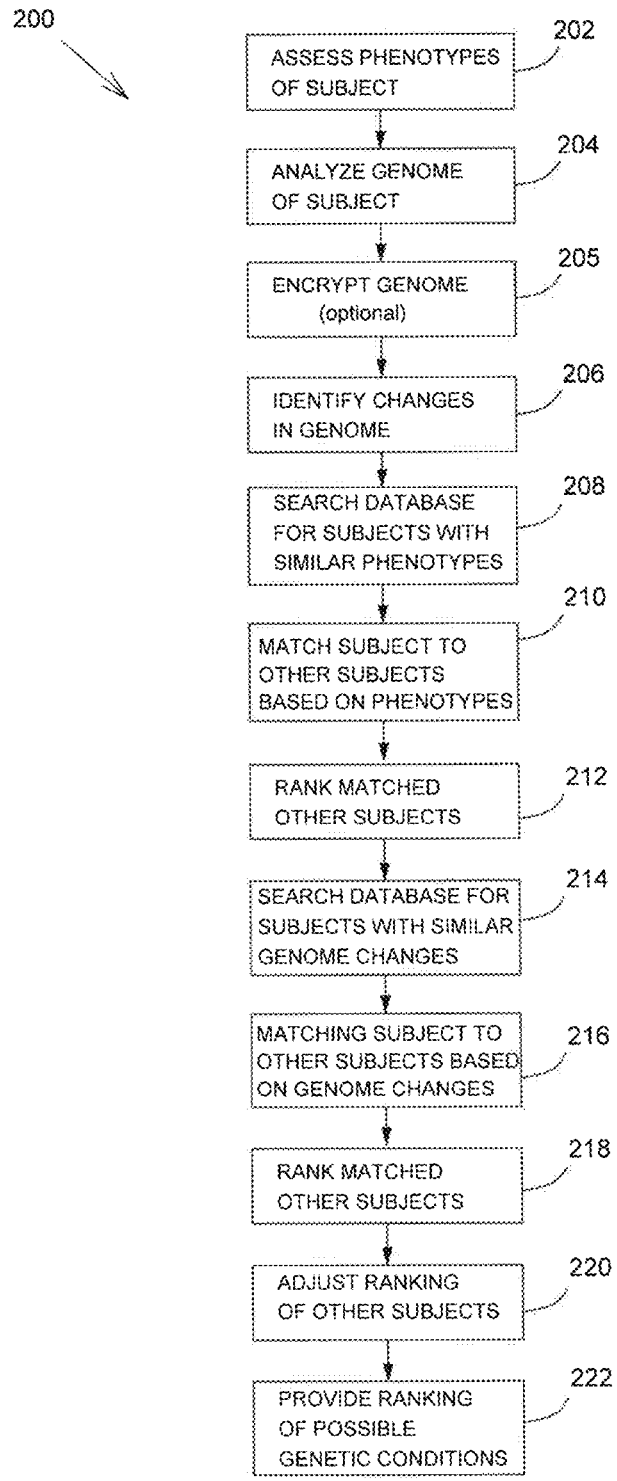
FIG. 3 is a flow diagram of an illustrative example of genetic trait search procedure executed by the genetic trait search system of FIG. 1 using the subjects database 26.

Referring to FIG. 3, there is shown a flow diagram of an illustrative example of the genetic trait search procedure 200 used by the genetic trait search system 10 using the subjects database 26. The steps of the procedure 200 are indicated by blocks 202 to 222.

The procedure 200 starts at block 202 where the phenotypes of a subject are assessed.

At block 204, the genome of the subject, for example from the data storage medium 20, is analyzed and optionally, at block 205, the genome of the subject is encrypted in order to ensure privacy.

At Block 206, changes in the (optionally encrypted) analyzed genome are identified by comparing it to a reference genome.

At block 208, the subjects database 26 is searched, via the search engine 24, using the assessed phenotypes of the subject from block 202, in order to identify other subjects with phenotypic similarities.

Then, at block 210, the subject is matched to other subjects of the subjects database 26 based on their phenotypic similarities and, at block 212, the matched other subjects are ranked based on the degree of phenotypic similarities, for example the number of common phenotypic features.

At block 214, the subjects database 26 is searched, via the search engine 24, using the genomic changes, identified at block 206, in order to identify, amongst the other subjects sharing common phenotypic similarities to the target subject, other subjects who additionally share one or more similar genomic changes with the subject. A predetermined phenotypic similarities threshold may be used to determine amongst which other subjects the genomic search will be executed.

At block 216, the subject is matched to other subjects of the subjects database 26 based on their similarities in genomic changes using predefined criteria and, at block 218, the matched other subjects are ranked based on their genomic changes similarities. In an embodiment, predefined criteria are used, for example a group of individuals with similar phenotypic features sharing an identical mutation is assigned a higher score than if the same group had different mutations present in the same gene.

Then, at block 220, the ranking of the other subjects is adjusted using the genomic changes ranking of block 218.

Finally, at block 222, a ranking of possible genetic conditions is provided via the user interface 16 based on the ranking of the other subjects provided at block 220, the ranking being indicative of the possibility that the subject shares the same genetic conditions with a corresponding other subject.

It should be noted that blocks 204, 205, 206 and 208 may be performed prior to block 202. There may be cases, for example, where the genome of the patient has already been sequenced at birth prior to any detection of phenotypes.

It is to be understood that in an embodiment genetic trait search procedures 100 and 200 may be combined in order to provide a ranking of possible genetic conditions based on data from both the genetic conditions database 22 and the subjects database 26.

In an embodiment, the genetic conditions database 22 include all single gene mendelian disorders and complex traits for which well-characterized and validated genetic variation results in significant contribution to the phenotype. Access to both the phenotypic characteristics for each genetic disease and all the genetic changes shown, to date, to cause or predispose to this genetic disease are available.

In an embodiment, both the phenotypic characteristics and the genetic variants known for each genetic condition are located in a single standardized genetic conditions database 22.

The present method provides for learning more about new phenotype-molecular correlations through properly designed, consented and approved research projects. Discovery of new genes for known syndromes, discovery of new syndromes or refinement of the phenotype of a known syndrome is facilitated. For example, in conventional approaches only patients who fit very closely all or almost all characteristics of a described genetic syndrome are tested for the genes involved. The present disclosure, on top of enabling earlier diagnosis via clinical utilization of genomic technologies [e.g. Jimenez-Escrig et al. Muscle Nerve. 2012 April; 45(4):605-10. PMID: 22431096], provides for the partial matches of patients to be identified and their characteristics enrich and refine the spectrum of clinical characteristics of any given syndrome.

The genetic conditions database 22 can be updated regularly as such whatever genetic change will be confirmed to cause or predispose to a disease will be added and as such, one is able to search the regularly updated genetic conditions database 22, which includes all phenotypically and genetically well characterized diseases, based on both genotypic and phenotypic characteristics of the specific patient being evaluated. When building the genetic conditions database 22 all "well documented phenotypes", "genetic traits", and "genetic diseases", including more common complex diseases can be included as long as they already have a well documented genetic change with a specific impact correlating to a specific weight factor thereby affecting their ranking. For example, BRCA1 mutations predisposing to a more complex disease, namely, breast cancer. Moreover, mutations in genes or regulatory elements not yet identified to play a role in a genetic disease but suspected to do so based on knowledge of them being linked to a pathway already documented to be involved in a specific disease (e.g. Ras pathway for SLO syndrome) may be assigned a specific, albeit lower, weight. As the database garners more information about modifier alleles (different genetic mutations that interact to predispose a patient to a disease) or epigenetic changes these can also be integrated in the algorithm and be useful for more complex phenotypes. For example, genetic modifiers of cancer risk in Lynch syndrome have been reported: shorter IGF1-CA repeats are associated with an increased risk for colon cancer and earlier age of onset among individuals who have a mutation in an MMR gene.

Similarly to the genetic conditions database 22 with genetic diseases a database with different genetic traits such as specific sub-phenotypes (rather than the genetic disease as an entity) identified during physical exam (e.g. "microcephaly") can be generated. All genes/genetic loci known to lead to a phenotype comprising the respective sign will be listed. Several sources, including textbooks describing the genetic pathophysiology of such sub-phenotypes will be useful to this end (e.g. Epstein et al: *Inborn Errors of Development*. Oxford University Press; 2008).

Similarly, more complex sub-phenotypes such as biochemical profiles can be useful. For example, schizophrenia has high heritability but complex inheritance and is suspected to constitute a constellation of different pathogenetic processes leading to a similar phenotype. Some of these pathogenetic processes may ultimately have a specific signature not only at the level of the genome, but also at the level of the epigenome, transcriptome or metabolome. If the known such signature profiles are listed in the genetic conditions database 22 used by the search engine 24, the data generated at the time of the clinical evaluation from RNA sequencing and/or metabolomic profiling or even epigenomic changes over time in such a (symptomatic) patient could serve as a phenotypic trait refining the search. For example, it is already known that in some biochemical genetic disorders, a.k.a. inborn errors of metabolism (IEM), psychiatric manifestations such as psychosis may be a predominant feature or the only presenting sign for many years leading to misdiagnosis for diagnoses such as schizophrenia. Several IEM are treatable and delay in initiating treatment can lead to permanent neurological damage or even early death. Storage diseases involving multiple small organelles (lysosomes, peroxisomes, mitochondria), iron or copper accumulation, as well as defects in other pathways (e.g. defects leading to hyperammonemia or homocystinemia and cobalamin deficiency) can present as psychosis. Pathogenic mutations in the respective genes and biochemical profiles, identified via metabolomics, characteristic of such a disease and indicative of the respective imbalance can serve to adjust the ranking of the genetic disease associated with psychosis and help the physician suspect and subsequently diagnose the respective rare IEM, which at early stages could be presenting as schizophrenia.

Subjects Database

Similarly to the genetic conditions database 22 with genetic diseases, a database containing information about the phenotypes and encrypted genomes of consenting human subjects can be generated. In subjects whose diagnoses have been confirmed their profile will also contain this information. The subjects database 26 can also include the encrypted genomes of consenting healthy subjects and their phenotypic features (including metabolomic, transcriptomic profiles, asymptomatic status) which can be updated at different points of time. The entry for each consenting subject will be password protected and the password only available to the patient. Each entry is coded with a specific number and the patient's identity remains protected at all times. This subjects database 26 is managed similarly to the guidelines for "biobanks". Specific protocols, ethical approval and special counseling for informed consent of the participating individuals are needed if someone wants to use the genome/exome data for research purposes. A subject from database 26 can opt to not be contacted for any research projects.

In an embodiment, only certified physicians can enter new data in the subjects database 26. The physician is given an option to indicate which phenotypic characteristics entered in the patient's profile are most striking/reliable. An option of assigning a weight about their confidence with regards to the presence or absence of each sign/symptom submitted is available. The option of a questionnaire by category (respiratory, cardiovascular etc.) aids in the standardization of phenotypic information entered for each new patient in the subjects database 26.

In one embodiment, only exome sequencing is performed. In another embodiment, sequencing will include non-coding regions to include non-coding genetic changes (e.g. mutation in regulatory elements) with a confirmed impact causing or predisposing to a specific phenotype. For example: "campomelic dysplasia" can be caused by SHOX enhancer deletion not involving the coding region of the SHOX gene itself. Many more such changes are expected to be found.

The genetic conditions database 22 is sequentially improved as more genetic defects become known. The genetic conditions database 22 includes genetic defects confirmed to cause or predispose to (alone or in combination with another factor) the genetic disease/trait.

The genetic conditions database 22 used can sort genetic loci under specific phenotypes based on the evidence of involvement in each. As previously stated, the genetic traits/phenotypes under which different genes/loci involved are listed include known genetic diseases, or specific sub-phenotypes like "microcephaly", or even more complex phenotypes such as biochemical profiles identified by metabolomics.

The data from a patient's genome sequencing can be used for different medical problems presenting at different times of a person's lifetime. The design of the presented approach could render obtaining genomic data during childhood or even newborn period practical, ethical and clinically useful. This is true because the genomic data can remain encrypted and thus only indirectly be useful for medical problems presenting at different points of a person's lifetime.

Weight/Impact Factors

The predetermined criteria integrated in the algorithm of the search application 18 correspond to the level of certainty for the pathogenicity of each genetic variant identified and evolves as new knowledge is acquired. They are equivalent, at any time, to the criteria used in the clinical evaluation of variants identified after a clinical genetic test. Some genetic variants can be unequivocally interpreted as pathogenic or normal variants on the basis of extensive clinical experience. In other cases, clinical experience is insufficient and pathogenicity is inferred based on extensive computational analysis.

Each variant identified can be classified to a class of variants defined based on existing published criteria (e.g. cmgsweb.shared.hosting.zen.co.uk or Richards et al. *Genet Med* 2008, 10(4):294-300). These guidelines for variant interpretation can be used to classify each variant identified in one of four or six different groups with a different "impact factor" potentially assigned to each group Alternatively, an overall score will be automatically calculated for each variant identified by simultaneously taking into consideration different factors each contributing a specific weight to the overall score. It is the overall score assigned to the variant which is used to adjust in each patient the ranking of the initial phenotype-based ranking of possible diagnoses.

Examples of such factors include: (1) Number of sequencing reads covering the position which is indicative of the certainty that the variant is real and not an artifact; (2) Frequency of the variant in genomic variation databases; (3) Type of mutation (silent, splicing, missense and effect on amino acid properties, nonsense, frameshift, intronic, mutation involving regulatory elements etc.); (4) Whether the identified variant has been previously been reported in disease in general and in the specific phenotype of interest more specifically; (5) Functional data, presence of in-vitro evidence supporting the pathogenicity of the variant; (6) Whether the variant is present in a gene which is part of a cellular pathway already known to be involved in the pathophysiology of the phenotype of interest; (7) Evolutionary conservation (conservation across species of the position where the variant is found).

Information about the pattern of inheritance and family history can also be factored in the weight assignment process and thus have an impact on the overall score calculated for the variant identified. For example: (1) When suspecting Autosomal Recessive pattern of inheritance, assigning a different impact for a variant present in homozygous state can be done. Having a different weight for homozygosity versus compound heterozygosity state of the variant analyzed can be important especially in the context of consanguinity; (2) When suspecting X-linked (recessive/dominant) pattern of inheritance the weight of variants present on the X-chromosome can be adjusted accordingly; (3) Presence or absence of the variant in other affected/unaffected family members by simultaneous comparison of the encrypted genomes of consenting family members; (4) Presence or absence of the variant in different tissues (affected versus unaffected) obtained from the affected individual. Simultaneous comparison of the encrypted genomes derived from the affected and unaffected tissues to assess whether the variant segregates with disease can be helpful for impact factor assignment in cases where mosaicism is present (e.g. de novo mutations in cancer).

Different statistical methods can be useful in the calculation of the overall impact score: e.g. relative risk, LOD score analysis, and/or Transmission Disequilibrium Test (TDT) analysis for each variant at a population and/or family level. Similarly, Bayesian analysis can be used to factor in the results of different computational tools in the overall score.

An option to allow for adjusting the default parameters is possible through an interactive checklist. One can adjust the weight/contribution of a specific parameter in the overall calculation of the variant's score. Alternatively, one can opt to include more or less factors than the selected default parameters in the calculation of the overall variant score.

The phenotype score is a function of how closely the subject's phenotypic features used in the search match with those of the known phenotype of the disease.

To minimize the risk for incidental findings a cut-off score for phenotype contribution can be set and the search application 18 algorithm can be trained to ensure that the phenotype drives (has the highest impact on) the ranking.

To minimize the risk for incidental findings the weight assigned to the phenotype contribution can be set to be much higher than that of the genetic variants so that the clinical features remain the principal driving force of the search.

Weight factors and the assigning process can be modified based on new knowledge. For instance, they can account for established gene-gene or gene-environment interactions in genetic diseases (e.g. Lincoln et al. 2009: *Epistasis among HLA-DRB1, HLA-DQA1, and HLA-DQB1 loci determines multiple sclerosis susceptibility*).

The data generated at the time of the clinical evaluation from RNA sequencing and/or metabolomic profiling or even epigenomic changes over time in a specific patient could serve in the calculation of the overall impact score for a variant. For example, in a given patient, the presence of characteristic changes at the level of the epigenome, transcriptome or metabolome known (or suspected based on other evidence as described below) to be associated with a specific genomic variant present in that patient, will be automatically identified and consequently raise further the overall impact score of that genomic variant in this specific patient. The (degree of) biochemical imbalance will constitute an important factor in predicting the pathogenicity, and thus in calculating the variant's "impact factor". To facilitate this, the databases used by the search engine 24 will list the different expression, metabolomic etc. profile signatures associated with each variant.

Candidate genes/loci for each genetic trait can also be included in the genetic conditions database 22, albeit with a lower "impact-score", representing the amount of evidence/probability of the genetic locus' involvement in the respective trait. These would be pre-selected candidate genes/loci, including regulatory elements, not previously documented to i.e. already known to be associated with a genetic trait but known to play a role in a pathway already known to be associated with a genetic trait. Pre-selected candidate genes/loci could represent loci with epigenomic, transcriptomic, metabolomic, or proteomic (e.g. protein interactome) evidence supporting their role in such a network, which when defected is known to lead to the genetic trait at hand. For any given patient, when the ranking of a specific genetic trait is changed significantly after taking the patient's genome into consideration, first all the genes documented to be associated with the genetic trait will be explored. If no mutations are found in these genes, consent to explore the pre-selected candidate genes/loci for the genetic trait at hand for mutations/changes can be obtained. This can lead to the identification of novel genes associated with known genetic traits/diseases.

Simplified non-limiting examples for assigned "mutation impact weights" are presented below. For the sake of simplicity, in each of the cases below the focus is placed on one parameter as if it was the only parameter contributing to the overall score assigned to a variant.

(a) All known common population variants based on the maintained up-to-date variants-database are identified as such and are assigned no or minimal weight.

(b) If the genome sequencing of the patient yields a mutation previously reported to cause (or predispose to) a known syndrome, the score of that syndrome would be multiplied by a multiplication factor (impact factor or weight) such as a number X wherein X=5, for example, so it would come higher on the resulting list.

(c) If a novel mutation is found in a gene known to be linked with a specific syndrome the multiplication factor (weight) could be 4 (X=4) in the case of a severe mutation like an early stop-codon versus weight of 3 (X=3) if a novel missense mutation.

(d) If genome sequencing of the patient yields a mutation in a gene not previously reported to cause this disease but involved in the pathway already known to contain genes leading to the syndrome (e.g. Ras pathway for SLO syndrome) a lower weight could be assigned such as X=3 if this mutation is a severe mutation/early stop codon, or X=2 if this mutation is missense mutation changing the property of the amino acid.

(e) Information about family history can be integrated in the algorithm assigning the weight/impact factor of the different mutations. For instance, when evaluating a consanguineous couple (or another case where autosomal recessive inheritance is suspected), the clinician can have the option to repeat the search or add a final step, adding more weight (e.g. X=6) for mutations present in both copies of any given gene. In the case of a patient from a consanguineous family, an even greater weight (e.g. X=7) could be assigned to identical mutations present in both copies of a specific gene. Similarly, if x-linked transmission is suspected, the database could be searched again and an increased weight could be assigned to mutations on the x-chromosome.

In another embodiment, instead of using multiplication factor, a different mathematical function/relationship can be used for the score adjustment. The numbers (X) discussed above can be replaced by "unknown variables" V, Y, Z, T, A where V>Y>Z>T>A and the ratio of V/Y, or Y/Z, or Z/T, or T/A may not be equal to one. The variables considered can be limited to two ("known pathogenic" versus "NOT", with a different score assigned to each category) or encompass different weights based on the degree of certainty for the pathogenicity of a variant.

In an embodiment, a disease present in the first ranking can be adjusted upward or downward on the second ranking. For example, the absence of a genetic variant in the genes corresponding to a specific disease can be used to decrease the overall score of that entry in the second ranking. This is achieved by multiplying by zero or a fraction number the score of these diseases during the process determining the second ranking (where, for example, absence of any genetic variant can be assigned a zero; while presence of a variant predicted to be benign can be assigned a score of 0.1, 0.01 etc. ensuring that the respective diagnosis stays on the list but in a lower position).

In an embodiment, the weights assigned both in the case of genetic variants and phenotypic features can be based on training the software in a standardized environment (e.g. standardized database, nomenclature, phenotypic evaluation/terminology, methodology of data collection and database update) using real patients' data. This can help to adjust the score/weight assignment process. For example, it helps to refine the prior/baseline probability when using Bayesian analysis of the data. Moreover, the data of successfully diagnosed patients can sequentially aid in refining weight assignment of different phenotypic features in respect to a specific diagnosis based on their positive and negative predictive value with respect to a given diagnosis.

In an embodiment, ranking of possible genetic conditions of a subject related to the assessed phenotype and the encrypted genome of this subject can be achieved using the subjects database 26 containing information about the phenotypes and encrypted genomes of other human subjects. In this case, there is no need of a priori weight assignment to specific phenotypic features or genetic variants; it is the extent of similarity of the subject's phenotypic and genomic data with that of different patients in the database, as determined based on pre-defined or predetermined criteria, that ultimately ranks the different clusters each of which represents patients who may have the same genetic diagnosis.

More particularly, the phenotype of the patient is searched against the phenotypes of the patients in the subjects database 26. For example if the clinician searches for four phenotypic characteristics, certain subjects in the subjects database 26 will also have all four traits in their profile and will thus be ranked as the highest cluster. Other subjects will have three traits so they will be ranked second from top and so on. That is first ranking. For the second ranking, the encrypted genome of the patient is searched against the entire encrypted genomes of the subjects in the subjects database 26 who are sharing a predetermined threshold of phenotypic characteristics with the patient. As such, the subjects who match with the patient based on the initial phenotype search have their genomes concurrently compared with the patient in order to identify whether at least some of these subjects share a genetic variant among themselves which is also present in the target subject. Therefore, if the clinician finds a genetic change in a large number of subjects who share the same phenotypic characteristics as the patient in question (or target subject) and that change is also present in the genome of the target subject, there is a strong probability that this change causes or predisposes to the said phenotypic characteristics. The extent of this probability can be assessed using statistical methods but a simplified example will follow to better convey the concept. If the clinician finds a group of subjects that has all four phenotypic characteristics and a mutation somewhere in the genome (e.g. in Gene X) which is exactly the same in all and is present in the patient in question, this group will have their rank adjusted to the top of the adjusted list. Another group of subjects will have all four phenotypic characteristics and a mutation in Gene X but not exactly the same mutation as in the patient, as such this latter group will have their rank adjusted downwardly as the 2nd group in the list. Still another group of subjects will have all three phenotypic characteristics and the exact same mutation in Gene X as the patient and so on.

Regarding the pre-defined or predetermined criteria with respect to phenotypic or genomic similarity, the clinician can use a spectrum of pre-defined or predetermined criteria which are each assigned a different weight score. These criteria correspond to the level of similarity shared between the individuals where different types of genetic variants are assigned different weight scores. For example, a group of individuals all sharing the same nucleotide change is assigned a higher score than another group having changes in the same gene which are not identical at the nucleotide level. Similarly, a group of individuals all having genetic changes in the same pathway but not all at the same gene will be ranked even lower.

In an embodiment, the final weight score of a genetic variant also takes into consideration predetermined criteria corresponding to the certainty for its pathogenic nature. For example, a group of individuals all having changes in the same gene which are not identical at the nucleotide level may be split into two groups with the subjects sharing known pathogenic mutations in the respective gene ranking higher than the subjects sharing not-known pathogenic variants.

In an embodiment, a minimum threshold score of shared similarity is used at the level of the phenotype. This means that the other subjects in the subject database 26 whose phenotypic characteristics are not matching those of the target subject beyond a certain level are filtered out from the first ranking.

In an embodiment, a threshold of a minimum number of subjects is required for a cluster to be considered as a separate entity.

In an embodiment, subjects whose extent of similarity falls in pre-set ranges are determined to be part of the same cluster. This means that two subjects in the subjects database 26 whose level of similarity in relation to the target subject is not identical but very similar are clustered together based on the predetermined criteria.

In an embodiment, there is a predetermined maximum number of clusters that are to be listed after the first or second ranking.

In an embodiment, genetic variant comprises a pattern of genetic variants. For example, in some cases predisposition to a genetic condition occurs by variants simultaneously present in multiple different genetic locations which may be interacting to cause the genetic condition. In this example, a group of patients all sharing enough phenotypic features and variants in multiple identical genetic locations is also ranked high in the adjusted list.

In an embodiment, similarity at the level of the phenotype comprises similarity between transcriptomic or metabolomic profiles of the subject and at least some of the patients in the subjects database 26.

In an embodiment, similarity at the level of the phenotype comprises similarity in changes of transcriptomic or metabolomic profiles in the subject and at least some of the patients in the subjects database 26.

In an embodiment, similarity at the level of the genotype comprises different levels of match between the encrypted genome of the subject and those of the patients in the subjects database 26 each assigned a different score: e.g. different score when there is a match as (1) an identical mutation, (2) mutations in the same gene, (3) mutations in different genes pre-classified to belong to the same pathway.

In an embodiment, subjects whose extent of similarity falls in pre-set ranges are determined to be part of the same cluster.

In an embodiment, a maximum number of clusters to be shown in the list provided after the first ranking is set in advance.

In an embodiment, a maximum number of clusters to be shown in the list provided after the second ranking is set in advance.

In an embodiment, the order of the steps is reversed and the initial ranking is based on the extent of sharing a similar genetic variant whereas the phenotype is used to adjust this ranking.

In an embodiment, the first ranking is based on the extent of sharing a similar genetic variant and the phenotype is used to adjust this ranking. The advantage of this is apparent in cases where the phenotypic features defining the disease entity are not as obvious (e.g. genetic syndromes which can have variable presentations not yet identified). It allows for initial clustering of subjects based on genetic similarities using pre-defined criteria but also makes use of the phenotype albeit in a refining rather than restricting fashion.

EXAMPLES

The present method will be further described by the following non-limiting examples.

A patient P referred to genetics for hypotonia suffers from Smith Lemli Opitz (SLO) syndrome. The patient P's exome has been sequenced. According to the crude data from exome sequencing, patient P has a mutation in the DHCR7 gene known to cause SLO. The patient is clinically evaluated by a medical geneticist following exome sequencing. The geneticist is not aware of the mutation in the DHCR7 gene nor that the patient had SLO syndrome. The only positive indications the geneticist identifies as important during the evaluation are "hypotonia" and a "heart defect". The geneticist performed two searches, a standard search as well as search in accordance with the present disclosure.

The standard search was performed on the OMIM (Online Mendelian Inheritance in Man) website, a database of human genes and genetic disorders. The search results for the keywords "hypotonia AND heart defect" garnered 175 hits. SLO was ranked #23 on this list.

The search in accordance with the present disclosure was also performed on the OMIM website in tandem in conjunction with the encrypted sequencing data. The geneticist did not look at the genome/exome sequencing data per se, the geneticist simply ran in tandem with the clinical criteria "hypotonia AND heart defect" the ranking system of the present method during the search which took into consideration all the mutations identified by genome/exome sequencing assigning different weights or impact factors depending on the type of mutation.

Given that the identified pathogenic mutation in DHCR7 was automatically assigned a high weight (e.g. X), this time the cumulative score of SLO (Y×X) was relatively higher than that of most other diseases on the list. Hence, this time, SLO was ranked higher on the search results list and the geneticist entertained the diagnosis of SLO. The physician suspected SLO and decided to send for DHCR7 gene clinical testing to confirm the diagnosis. In this example, as per current practice, the geneticist before undertaking clinical molecular testing could have chosen to send a less-expensive non-molecular lab test named a sterol profile which if positive would have further increased the physician's a priori suspicion for SLO. Similarly, the physician could have discussed his suspicion of SLO syndrome with the patient (or the family of the patient as appropriate) and obtained consent to specifically analyze, in collaboration with the clinical molecular lab director, the patient's encrypted exome sequencing data in DHCR7 gene before ultimately pursuing the clinical diagnostic test. This would have allowed for a more careful analysis of the changes identified by exome/genome sequencing in this locus and provided further evidence to support that the diagnosis of SLO syndrome needed to be entertained.

Another patient P2 presents to clinic with fever and respiratory symptoms/signs. The clinician aims to identify the infectious agent to treat the patient with the right medication as early as possible. A database with the nucleotide sequence of each bug known is available. The clinician collects a blood or sputum sample from the patient and sequences/analyzes the total DNA present in the sample. The clinician then searches the database for "respiratory infection" as the phenotypic characteristic. As a result of this search a list of the names of all pathogens known to cause a respiratory infection is provided (e.g. in alphabetical order or in order of geographic prevalence). The search engine is then automatically comparing the sample's total DNA to the reference human genome sequence and/or unaffected (not-infected) family members. The non-matching DNA, corresponding to the DNA of the infectious agent, is automatically identified and compared against the database containing the nucleotide sequences of all bugs known. The extent of similarity serves to determine the score/weight assignment for each pathogen and to subsequently adjust the ranking of the possible infectious causes. This enables the physician to identify the infectious cause and treat the infection as early as possible (e.g. as early as fever develops).

In this example, instead of providing the list of infectious agents one could arrange to automatically provide, while respecting the same order, the corresponding medication targeting each of these infectious agents. Moreover, if there are several medications which could effectively treat a specific infectious agent, the final ranking of these medications could also take into consideration the genomic information of the host. For instance, the presence of a genetic variant in the host which has been documented to modulate the response to a specific medication or increase the risk for specific side-effects can be automatically factored in the overall score/weight assignment of that medication. For this to occur, the database will need to include the medication to which each infectious agent responds and under each medication the variants known to play a role in its effectiveness or side-effects.

There exist already examples in the literature suggesting that next-generation sequencing will be soon used in routine clinical microbiology practice (Didelot et al. *Nat Rev Genet.* 2012 PMID: 22868263).

Example of pharmacogenomics: genetic variation plays a key role in adverse reaction to drugs as well as to differences in the effectiveness of drug treatments. A good example of using pharmacogenetics clinically is testing for CYP2C9 (MIM #601130) and VKORC1 (MIM #607473) variants conjointly to determine dose requirements and hence susceptibility to adverse drug reactions related to warfarin. Such applications would be particularly valuable for many elderly patients and others with chronic diseases who must take many medications concurrently (Tucker et al. *Massively parallel sequencing: the next big thing in genetic medicine*, Am. J. Hum. Genet. 85 (2009) 142-154).

A patient P3 presents to clinic with an adult onset neurological disease characterized by severe ataxia, dystonia, psychiatric symptoms and white mater changes on brain MRI. After extensive testing the diagnosis remains unknown since the genetic syndrome (GS) of the patient P3 has never been described before. However, several other patients in the centralized database containing the phenotypic and encrypted genomic information of a large number of patients also have the same not yet-identified diagnosis (GS). The cause in most of these patients is a mutation in the same gene (GSG). The patient P3 undergoes a lumbar puncture and a CSF sample is collected. The metabolome of the CSF sample is analyzed (i.e. all the different metabolites in the CSF of the patient are identified and analyzed). In the centralized database, some of the subjects also have CSF metabolomic data available in their profiles. These CSF data are already organized in the database in different clusters based on similarity of the profiles. These clusters can be depicted similar to current ontology/phylogenetic tree analysis diagrams. When the patient P3's CSF metabolomic data is searched as a phenotypic feature against the existing centralized database he is classified by the software in the same cluster as patients having similar metabolomic profiles (first ranking). This ranking of different clusters is adjusted by the software to maximize the score assigned to the cluster containing all the patients in the database with the features of GS disease present in the patient P3 and entered in the search and a mutation in the same gene, in this example, GSG gene. By clicking on the top-ranked cluster in the results section of the search the physician is able to access its characteristics, including the phenotypic features and the "gene variant" shared by all patients in this cluster (here mutations in GSG gene). Hence, this system enabled the physician to identify the novel genetic syndrome in the patient P3, the genetic cause and metabolomic profile shared by all patients in the same cluster. After careful verification and validation of the findings in his patient the physician publishes this new syndrome and the data about the underlying pathophysiology (genetic, metabolomic data). He then updates his patient's profile to include the new syndrome as the confirmed diagnosis. When another patient with GS syndrome from the top-ranked cluster mentioned above presents in follow-up visit to her physician, the physician runs the software and takes advantage of the new diagnosis entered in the database.

In an embodiment, in the above example the metabolomic data of the patients in the database are not already organized in different clusters based on similarity of the profiles. Approaches such as Principal Component Analysis (PCA), Weighted PCA, and Vector Analysis are used to compare the metabolomic data of the target-subject with those of the subjects in the database and rank the different clusters accordingly.

In an embodiment, a pre-set level of statistical significance, e.g. a p-value can be used in these analyses.

In an embodiment, similar to the CSF metabolome being used as a phenotypic feature other sources of metabolomes (e.g. blood, urine, lipids) can be used.

In an embodiment, similar to the CSF metabolome being used as a phenotypic feature, clinical features can also be used. Principal Component Analysis (PCA) and Vector Analysis also apply in this search Regarding the next example, it should be noted that as documented in the literature, psychosis can be the isolated presenting feature for many years in several inborn errors of metabolism (such as cobalamin C, Nieman Pick C, X-linked adrenoleukodystrophy, Metachromatic Leukodystrophy, and Wilson's disease) some of which are treatable, especially if diagnosed in early stages.

Three different patients (A, B, C) present in clinic with psychosis. All three patients have a different inborn error of metabolism (IEM) associated with psychosis (IEM1, IEM2, IEM3, respectively; where IEM1 is caused by changes in "gene 1"; IEM2 in "gene 2"; IEM3 in "gene 3"). However, because their metabolic diseases are in their very early stages and no other symptoms are present, nor neurological or other signs were found during the physical examination. The physician examining these three patients was not aware of their underlying diseases. The physician's evaluation is only positive for psychosis.

A "Sample database" is provided containing 15 well-known IEMs (including IEM1, IEM2, IEM3) associated with psychosis and 85 unrelated well-known genetic diseases. This database includes an entry for each of these 100 genetic diseases. Each entry summarizes the clinical features of the respective disease (e.g. as found in OMIM or in HPO database). Each entry also includes the known gene(s) corresponding to the respective disease and under each gene all the known pathogenic/causative variants (e.g. as identified in the HGMD or ClinVar databases).

The exomes of the three above mentioned patients, "Exome 1", "Exome 2", "Exome 3", respectively, are analyzed.

In this example, existing tools (e.g. BWA, SAMTools, GATK etc.) are used to automatically analyze the patient's Exome for variation.

With regards to storage of the Exome Sequencing data, switching the FASTQ file to SAM and ultimately BAM format is useful both in terms of storage space requirements and compatibility with existing tools for analysis of the data.

Cleaning of the BAM data from pseudo-deletions and pseudo-duplications present because of sequence malalignment is helpful prior to the analysis with GATK tools which can yield the list of all variants present. Finally, having the genetic variant data available in a VCF format is helpful as this is compatible with most tools in the public domain.

Patient A in his exome ("Exome 1") has a pathogenic change from the changes listed in the "Sample database" under "Gene 1" causing IEM1 as described above. Accordingly, the other two patients have mutations in "Gene 2" (in "Exome 2") and "Gene 3" (in "Exome 3"), respectively.

The physician after the evaluation of Patient A takes advantage of the "Sample database", the encrypted genomic data of the patient (i.e. encrypted "Exome 1"), and the method provided herein. The method provided herein allows to identify all the variants in the encrypted Exome of Patient A (i.e. "Exome 1") and determines whether they are classified as pathogenic or not in the "Sample database". In this case, all the changes present in the Sample database (and so by default are pathogenic) are automatically assigned a high score (e.g. X=100) while all the remaining variants identified in the patient's Exome will be assigned a very low score (e.g. of Y=1 or 0.1).

In all three Exomes ("Exome 1", "Exome 2", "Exome 3") benign and/or pathogenic variants could be artificially assigned in some randomly selected genes corresponding to the 100 diseases listed in the "Sample database" and have the process repeated.

Searching the "Sample Database" using the keyword "Psychosis" refines the search results ranking the genetic disease in the sample database which are relevant to psychosis based on the presence of absence of a pathogenic mutation. Within these two categories the diseases will be ranked in alphabetical order.

The same process is repeated with the addition of more than one word in the original phenotype-based search (for example, phenotypes the physician identified during his evaluation: "psychosis", "dystonia", and "nystagmus"). This further refines the final ranking since in the first example the phenotype match score ("psychosis") was the same in for all diseases listed in the "Sample database" associated with psychosis but in this version their phenotype match score is adjusted based on the extent to which the clinical features entered in the search exist as part of the clinical features under the entry for the respective disease in the "Sample database".

Moreover, if the clinical features listed under each disease in the "Sample database" are assigned a different score based on the positive and negative predictive value they have for that disease (e.g. using frequencies listed in HPO database; during the matching process the method can also take this into consideration and refine score assignment.

In a similar application instead of using the "Sample Database", the clinician can use ClinVar or HGMD directly within the context of the present method in order to identify the genetic variants present in the target subject's genome listed as pathogenic in the respective database and assign the score depending on the classification group each variant belongs.

Tools

The following tools, can be useful within the context of the present disclosure:

Potentially useful curated databases include the Human Gene Mutation Database (HGMD), Diagnostic Mutation Database (DMuDB), MutaDatabase, and the ClinVar database. With regards to phenotypic data, an interface with freely available or private databases (such as OMIM, Genereviews, London Medical Databases, or Possum Web) will be needed.

In order for the search to be optimized, a standardized vocabulary of phenotypic abnormalities encountered in human disease and the semantic relationships between them will be important. The Human Phenotype Ontology (HPO), Phenomyzer (hum-molgen.org), could be very useful to this end.

Mutalyzer (mutalyzer.nl) The aim of this program is to support checks of sequence variant nomenclature according to the guidelines of the Human Genome Variation Society.

OMIM (omim.org) A regularly updated catalogue of human mendelian disease focusing on the relationship between genes and their molecular variants and associated phenotypes. OMIM primarily describes single gene mendelian disorders but also includes other phenotype entries describing complex traits for which variation in a single gene results in significant contribution to the phenotype. Moreover, it includes genetic disorders shown to be due to gene deletions or duplications. To further aid in searching clinical features searches can be restricted to major anatomical headings within the Clinical Synopses.

VarSifter (research.nhgri.nih.gov), freely available tool for exome analysis: "VarSifter" is a graphical Java program designed to display, sort, filter, and generally sift variation data from massively parallel sequencing experiments. It is designed to read exome-scale variation data in either a tab-delimited text file with header, or an uncompressed VCF file. These files should be pre-generated with desired annotation information one would like to view.

Sequence Variant Analyzer, or SVA, (www.svaproject.org) is a software tool to analyze the genetic variants identified from -genome sequencing studies. SVA is designed for two specific aims: (1) To annotate the biological functions of the identified genetic variants and group them, conveniently; (2) To find the genetic variants that are associated with or responsible for the biological traits or medical outcomes of interest. SVA enables the user to take advantage of a gene filter (e.g. based on quality score, pathway, gene-ontology, OMIM information) and different biological databases when performing the functional annotation. It also allows users to explore the strength of the associations of identified variants with studied traits Freely available statistical software like Family Based Association Test, a.k.a. FBAT, can be useful to for the calculation of the "impact score" of each variant and help support its pathogenicity, for instance, based on the cosegregation of the variant with disease.

"UCSC Genome Browser", genome.ucsc.edu provides for looking at the conservation of sequences across species which can be useful as a means of predicting pathogenicity.

ANNOVAR, openbioinformatics.org provides for the functional annotation of genetic variants from high-throughput sequencing data.

Still other tools include: BWA (bio-bwa.sourceforge.net); SAMtools (samtools.sourceforge.net); SOAP (soap.genomics.org.cn); Ensembl (ensembl.org); DECIPHER: "Database of Chromosomal Imbalance and Phenotype in Humans Using Ensembl Resources" (decipher.sanger.ac.uk); the "1000 genome database" (1000genomes.org) a collection of all the variations in healthy individuals, "Human Genome Variation" (hgvs.org); "Locus Specific Mutation Databases" (hgvs.org); "Human Gene Mutation Database" (hgmd.cf.ac.uk); dbSNP database (ncbi.nlm.nih.gov); Genome Trax (avadis-ngs.com); Catalogue Of Somatic Mutations In Cancer (COSMIC) database (sanger.ac.uk); Genecards (genecards.org); PolyPhen, (genetics.bwh.harvard.edu); SIFT (sift.jcvi.org); ANNOVAR (openbioinformatics.org); SNPnexus (snp-nexus.org); Mutation assersor (mutationassessor.org); FASTSNP (fastsnp.ibms.sinica.edu.tw); Conserved Domain-Based Prediction (CDPred) Software (research.nhgri.nih.gov); MutPred (mutpred.mutdb.org); SNPtoGO (webtools.imbs.uk-sh.de); Gen2Phen (www.gen2phen.org); A probabilistic gene network (AraNet): Integrating Rare-Variant Testing, Function Prediction, and Gene Network in Composite Resequencing-Based Genome-Wide Association Studies (CR-GWAS) (Zhu et al. 2011 August; 1(3):233-43. PMID: 22384334); Probabilistic Disease-Gene Finder, VAAST: A probabilistic disease-gene finder for personal genomes. Yandell et al Genome Res. 2011 September; 21(9):1529-42. PMID: 21700766; GeneMANIA ((genemania.org); A guide to web tools to prioritize candidate genes (Tranchevent et al Brief Bioinform 2011; 12: 22-32); HaploReg (Compbio.mit.edu/ HaploReg); Human Serum metabolome (serummetabolome.ca); Database resources in metabolomics: an overview (Go E P. J Neuroimmune Pharmacol 2010, 5(1):18-30); Integration of bioinformatics resources for functional analysis of gene expression and proteomic data (Huang et al. Front Biosci 2007, 12:5071-5088); RNA sequencing (RNA-seq) in gene expression studies: A framework for variation discovery and genotyping using next-generation DNA sequencing data (DePristo, M. A. et al. Nat. Genet. 43, 491-498 (2011); Understanding mechanisms underlying human gene expression variation with RNA sequencing (Pickrell, J. K. et al. Nature 464, 768-772 (2010); Transcriptome genetics using second generation sequencing in a Caucasian population (Montgomery, S. B. et al. Nature 464, 773-777 (2010). PharmaADME "Core Gene List" (pharmaadme.org); Pharmacogenomics Knowledge Base (PharmGKB; pharmgkb.org).

Of course, the skilled artisan will understand that still other similar tools can be used within the context of the present disclosure.

Other Applications

An approach similar to the one described above for genome/exome sequencing applies to other types of genomic data analysis: one such example is Array-based comparative genomic hybridization (aCGH) technology which allows for whole-genome analysis for DNA gains and losses. In accordance with the method described, such changes in a patient with specific phenotypic features are assigned a different impact factor/weight based on pre-determined criteria similar to those used in clinical interpretation of aCGH findings. For example, many of these gains and loses are known to involve clinically important loci and lead to well known genetic syndromes so these would be assigned high impact factors. Similarly, genetic changes involving areas of the genome well conserved across-species are assigned high impact factors while deletions/duplications listed as normal variants present in the general population would be allocated minimal scores. By taking the weights of these chances into consideration, the present method aids in adjusting the phenotype-based ranking of the possible genetic conditions of the patient.

The database could also be searched using a Medical Subject Headings (MeSH)-like approach. MeSH is a comprehensive controlled vocabulary available at MEDLINE/PubMed useful for indexing journal articles and books in the life sciences which can also serve as a thesaurus that facilitates searching. Similarly, classification of clinical features in sub-groups (e.g. "nail dysplasia" or "short stature, non-skeletal dysplasia") may be helpful. A very useful such existing thesaurus is the Human Phenotype Ontology (HPO), Phenomyzer (hum-molgen.org). A physician may select one of these categories and obtain a list of genetic diagnoses sharing the corresponding feature. This list could be initially ranked based on different characteristics such as population prevalence. Based on the method herein, the ranking will change when integrating the patient's genomic data and this facilitates testing prioritization.

The presented approach can be used for pre-conceptual counseling, for example, in couples interested to learn about the risk for their children to develop different severe recessive diseases without necessarily learning about their own carrier status for all these diseases. By comparing the encrypted genomes of the parents for the loci corresponding to a preselected list of targeted genetic recessive diseases, only diseases for which both parents are carriers will be ranked highly above a pre-set threshold and get flagged. Hence, the couple may decide to seek counselling only for these diseases. The selection of the diseases targeted could make use of the idea for lower- and higher-risk categories or "bins" based on clinical validity and actionability. (Deploying whole genome sequencing in clinical practice and public health: meeting the challenge one bin at a time. Berg J S, Khoury M J, Evans J P. Genet Med. 2011 June; 13(6):499-504. PMID: 21558861).

Overall, the benefits of the present approach can be illustrated with the following analogy. We can assume that there are two different languages, Language (1) and Language (2), both using the same alphabet (e.g. Latin alphabet in French and English). Now picture someone who speaks Language (1) trying to read a book in Language (2). However, since only few words are similar enough between the two languages (e.g. between English and French) he can decipher the meaning of only a few words/phrases. The biggest part of the book remains incomprehensible. Now think of the person speaking Language (1) taking an immersion class where, through exposure, he learns more of the language (2) and can thus progressively read more and more parts of the book. The approach described hereby provides the structure for the "immersion class" that will help us progressively understand better the information encoded in the genome ("book"). Language (1) is Medical Genetics and Language (2) is Medical Genomics. Using the "alphabet" of "Medical Genetics" scientists have been able to write all the sections of the book (i.e. sequencing data of the Genome). Based on the knowledge of "Medical Genetics" we can also understand some parts of the genome (i.e. read parts of the book where words are close to the ones we already know) and associate them with genetic traits/diseases. By protecting the patients' privacy and autonomy while at the same time allowing for adequate flexibility in data analysis, the approach described facilitates the use of real patients' data (corresponding to learning by exposure in an "immersion class") as a teaching method of "Medical Genomics" (Language 2).

Generally stated and in accordance with an embodiment of the disclosure, there is a computer implementable system for managing genetic information associated with a human genome of a target subject and displayed via a graphical user interface (GUI). The system database having stored therein: (a) genetic diseases linked at least in part to at least one relevant region in the genome of the target subject and at least in part to at least one phenotypic characteristic, and (b) at least one reference genome or portions thereof. A user is prompted via the GUI to input data related to assessed phenotypes of the target subject via an input interface and this data is acquired. An encrypted genome or portions thereof of the target subject are stored in the data storage medium and accessed.

The database is searched by automatically comparing the assessed phenotypes of the target subject with (a) in the database in order to provide one or more matches between the assessed phenotypes and a genetic disease stored in the database thereby providing in real time a first ranking list of possible genetic diseases. Each possible genetic disease is related to at least one genetic variant indicative of that disease. Genetic variants are identified in the encrypted genome or portions thereof of the target subject by automatically comparing it to (b) thereby providing a first ranking list of possible genetic diseases. Overall weight scores are assigned to each of the identified genetic variants in the first ranking list based on predetermined criteria and the first ranking list by a re-ranking thereof based on the assigned overall weight score to provide a second ranking of possible genetic diseases based on the re-ranking of the first ranking. The second ranking comprising a list of possible genetic diseases above a predetermined overall weight score threshold; displaying via the GUI the second ranking list of possible genetic diseases and/or a visual representation of a portion or portions of the genome of the target subject that are related to the second ranking.

The second ranking list of possible genetic diseases are visually displayed to be differentiated in order of corresponding assigned overall weight score. The visual representation of the portion or portions of the genome of the target subject that are related to the second ranking are visually displayed in order of corresponding overall weight score of the possible genetic diseases.

When receiving an input command via the input interface for selective decryption of a portion or portions of the genome of the target subject it is determined if the input command for selective decryption is for the portion or portions of the genome of the target subject that are related to the second ranking (Accessible Data) or that are not related to the second ranking (Confidential Data). The portion or portions of the genome of the target subject are decrypted if part of the Accessible Data when receiving the input command therefor and displayed via GUI. Decryption is blocked for the Confidential Data when receiving the input command therefor. The GUI indicates that decryption is blocked when receiving the input command for decryption of the Confidential Data.

In an embodiment, a problem being solved by the disclosure is blocking portions of the genome from being decrypted based on the second ranking results. Blocking of portions of a genome from being decrypted "cleans up" the user interface for the system user in an organized, efficient, user-friendly manner, saving the system user time, limiting errors and avoiding system users from going on a 'fishing expedition' to retrieve information. The system user cannot access useless portions of the genome thus providing a user interface that avoids inadvertent user errors (i.e., unblocking irrelevant regions from being decrypted). The fact that only the useful second ranking portions are allowed to be decrypted avoids a large amount of information to be displayed and thus provides an GUI that further facilitates use.

Figure 4:
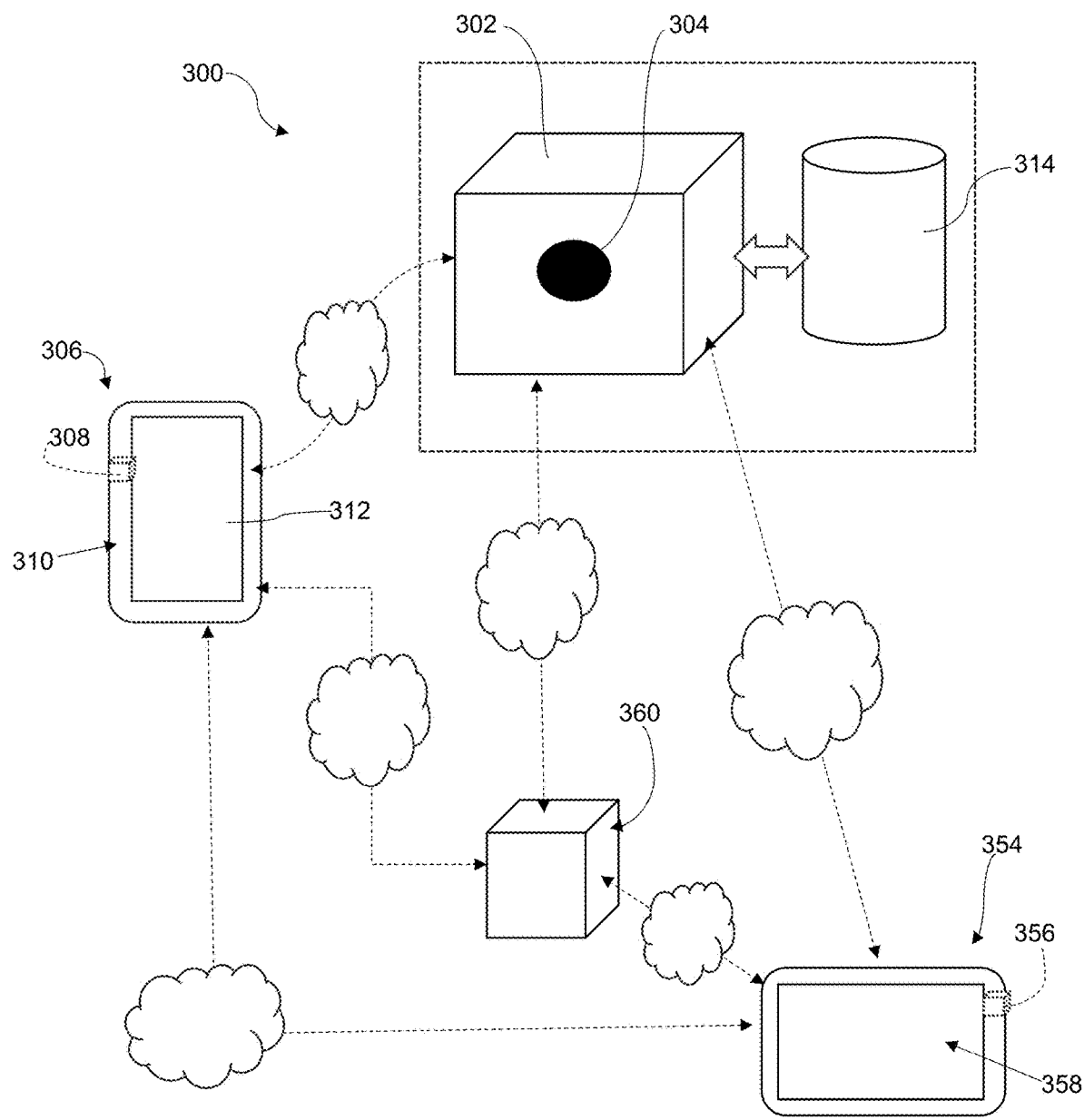
FIG. 4 is a schematic representation of a computer implementable system for managing genetic information associated with a human genome of a target subject, in accordance with a non-restrictive illustrative embodiment of the present disclosure.

With reference to FIG. 4, there is shown a computer implementable system 300 for managing genetic information associated with a human genome of a target subject.

The system 300 comprises a system controller 302 with an associated memory 104 of processor executable code. The system controller 302 may comprise one or more processor units in a network communication.

The system controller 300 is in operative communication with a user device 306 comprising a device controller 308 with a device memory thereof, a user input/output interface 310 including a display interface 312 for displaying a graphical user interface (GUI). In an embodiment, the device controller 308 comprises a microprocessor within the user device 106. In an embodiment, the device controller 308 comprises a microprocessor in operative communication with a remote master device controller. In an embodiment, the device memory is stored within the microprocessor or within the remote master device controller or within a combination thereof.

The system 300 comprises a database 314 having stored therein computer data identifying (a) genetic diseases linked at least in part to at least one relevant region in the genome of the target subject and at least in part to at least one phenotypic characteristic, and (b) at least one reference genome or portions thereof. In an embodiment, the system controller 302 is in operative communication with the database 314 which is hosted on another controller. In an embodiment, the system controller 302 comprises the database 314.

In an embodiment, the processor executable code is executed by the system controller 302. In an embodiment, the processor executable code is provided for being downloaded into the memory of the device controller 308 to be executed thereby or to be executed synergistically by a combination of the system controller and the user device controller.

Execution of the processor executable code by the system controller 100 or by the user device controller 308 or by the synergistic combination thereof provides for the system controller 302 or the user device controller 308 or the combination thereof with performing computer-implementable steps as provided hereinbelow. In an embodiment, the computer-implementable steps are performed in real time.

The system 100 prompts a user via the GUI to input data the via the input interface that is related to assessed phenotypes of the target subject. The user may be a technical expert, a clinician, a physician, a researcher, and the like as is known in the art. Indeed, the user may also be the target subject inquiring about their data. In an embodiment, prompting is performed via predetermined computer generated questions and/or forms. The system 300 acquires the foregoing information and stores it in a memory bank of the system 300 as defined herein. The memory bank includes a memory 304 or any other memory on a device or a controller accessible by the system 300 as provided herein.

The system 300 comprises a data storage medium such as a computer file, a chip, a USB, a memory stick, a memory key, an online server. a CD, a DVD, a cloud and the like as can be contemplated and modified by those having skill in the art within the context of the present disclosure. The data storage medium comprises stored and encrypted computer data related to the target subject's genome or portions thereof.

The system 300 accesses the encrypted genome or portions thereof of the target subject stored in the data storage medium. This encrypted data is accessed via direct communication between the user device 306 and the data storage medium or via remote communication therebetween with the data storage medium being hosted on a remote controller or on the system controller 302 or another device such as a monitoring device as will be further discussed herein.

Once the system 300 accesses the encrypted genome or portions thereof it searches the database 314 by automatically comparing the assessed phenotypes of the target subject with (a: genetic diseases linked at least in part to at least one relevant region in the genome of the target subject and at least in part to at least one phenotypic characteristic) in the database in order to provide one or more matches between the assessed phenotypes and a genetic disease stored in the database thereby providing in real time a first ranking list of possible genetic diseases. Each possible genetic disease being related to at least one genetic variant indicative of that disease. In an embodiment, the genetic diseases are ranked by the system based on phenotypic/clinical similarity between the phenotype of the patient and that of the disease. Each disease is linked to a genetic position. Then the genetic variants of the patients in the genes corresponding to the disease are influencing the second ranking In an embodiment, the system 300 then identifies genetic variants in the encrypted genome or portions thereof of the target subject by automatically comparing it to (b: at least one reference genome or portions thereof) in the database thereby providing a first ranking list of possible genetic diseases.

The system 300 simultaneously assigns an overall weight score to each of the identified genetic variants in the first ranking list based on predetermined criteria and adjusts the first ranking list of possible genetic diseases by a re-ranking thereof based on the assigned overall weight score in order to provide a second ranking list of possible genetic diseases based on the re-ranking of the first ranking. The second ranking comprises a list consisting of one or more possible genetic diseases above a predetermined overall weight score threshold.

Figure 5:
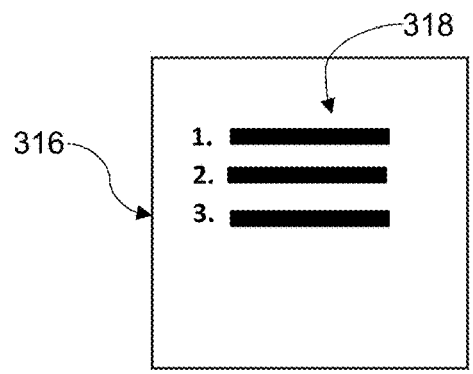
FIG. 5 is schematic representation of a graphical user interface of the system of FIG. 4 in accordance with a non-restrictive illustrative embodiment of the present disclosure.

The second ranking list of possible genetic diseases is displayed via the GUI and being visually displayed to be differentiated in order of corresponding assigned overall weight. For example and as shown in FIG. 5, a GUI 316 is shown displaying a second ranking list 318 in numerical order (e.g. 1., 2., 3.) of the assigned overall weight hierarch (i.e. highest weight score to lowest weight score). In another embodiment, the list of genetic possible genetic diseases is displayed via the GUI and the order of assigned overall weight score which identifies highest to lowest probability is marked by a message, a symbol, an icon, a color, and the like including combinations thereof. Examples of the foregoing are shown in FIGS. 6, 7 and 8.

Figure 6:
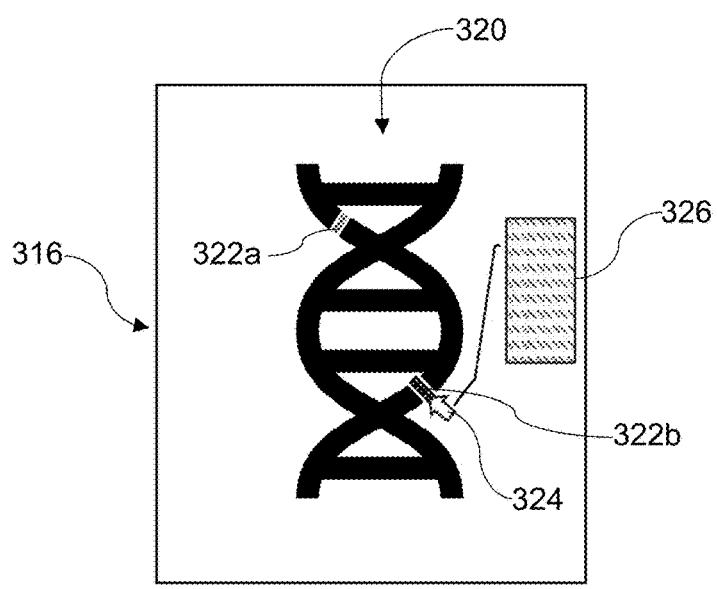
FIG. 6 is schematic representation of a graphical user interface of the system of FIG. 4 in accordance with another non-restrictive illustrative embodiment of the present disclosure.

Turning to FIG. 6, the second ranking list may displayed via the GUI 316 with a visual and schematic representation of a helical genome 320 with two identified areas 322a and 132b which correspond to genetic variants in the genome 320 related to genetic diseases. The identified areas identified by visually differentiated markers indicative of an assigned overall weight hierarchy. In an embodiment, when entering an input command such as, for example, positioning a cursor 324 over an identified area (e.g. 322b) or clicking the area via the cursor 324 or via a touch command, a message is displayed via the GUI such as a message box 326 providing further data regarding the identified area 322b (such as genetic data or one or more listed diseases corresponding to the variant). If the variant 322b codes for more than one disease, then the diseases are indicated within the message box 326 and visually identified based on their corresponding overall weight score.

Figure 7:
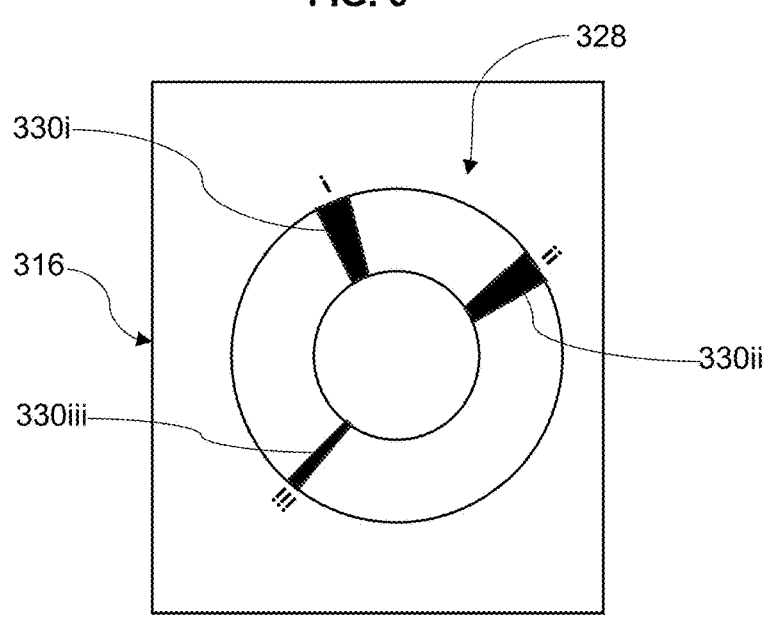
FIG. 7 is schematic representation of a graphical user interface of the system of FIG. 4 in accordance with a further non-restrictive illustrative embodiment of the present disclosure.

In FIG. 7, there is shown a circular schematic representation 328 of the genome displayed via the GUI with areas 330i, 330ii and 330iii visually identified thereon and corresponding to the second list of genetic diseases. Indeed, the areas 330i, 330ii, 330iii correspond to genetic variants in the genome coding for genetic diseases. The hierarchy of the overall assigned score is marked by roman numerals i, ii, iii. Of course, the hierarchy can be marked by other visual cues such as colors for example.

Figure 8:
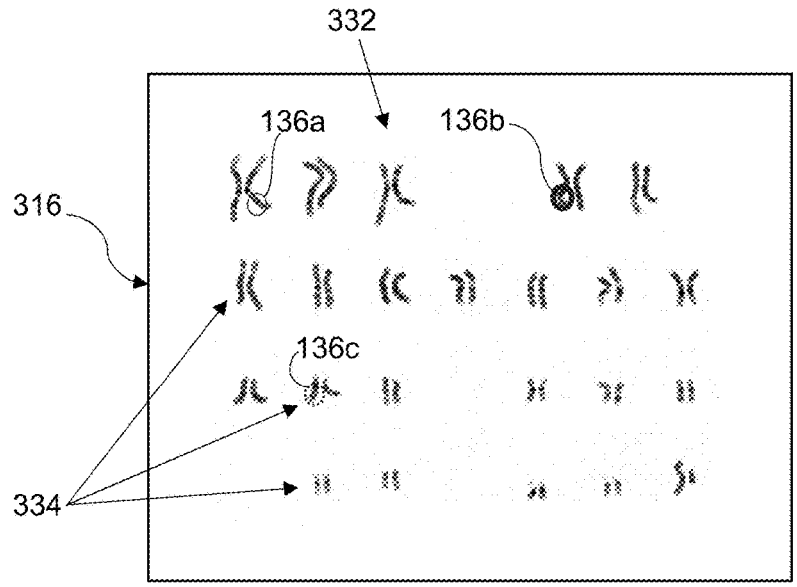
FIG. 8 is schematic representation of a graphical user interface of the system of FIG. 4 in accordance with yet another non-restrictive illustrative embodiment of the present disclosure.

In the example of FIG. 8, there is shown an image of a karyotype picture 332 of the target subject's complete set of chromosomes 134 displayed via the GUI 316 with areas 336a, 336b, 336c identified thereon corresponding to variants related to possible genetic diseases and being visually marked (via intensity of marking bold to less bold or via a color code etc.) to indicate the overall assigned score hierarchy.

In another non-illustrated embodiment, the GUI provides an image of the human body with the user selecting via input command parts (organs) of interest on the human body icon of interest thereby requesting via this input command if there are corresponding diseases (e.g. heart genetic conditions) that have passed the threshold for that given patient. Indeed, this can constitute as part of the filtering criteria discussed further below.

The system 300 provides for receiving an input command via the user input interface for selective decryption of a portion or portions of the genome of the target subject. The system 300 determines if the input command for selective decryption is for a portion or portions of the genome of the target subject that are related to the second ranking (herein referred to as "Accessible Data") or that are not related to the second ranking (herein referred to as "Confidential Data"). Thus, the present system 300 provides for managing genetic information associated with the human genome of the target subject such that only the areas of the genome that have been determined to be related to a possible genetic disease can be decrypted.

Figure 9:
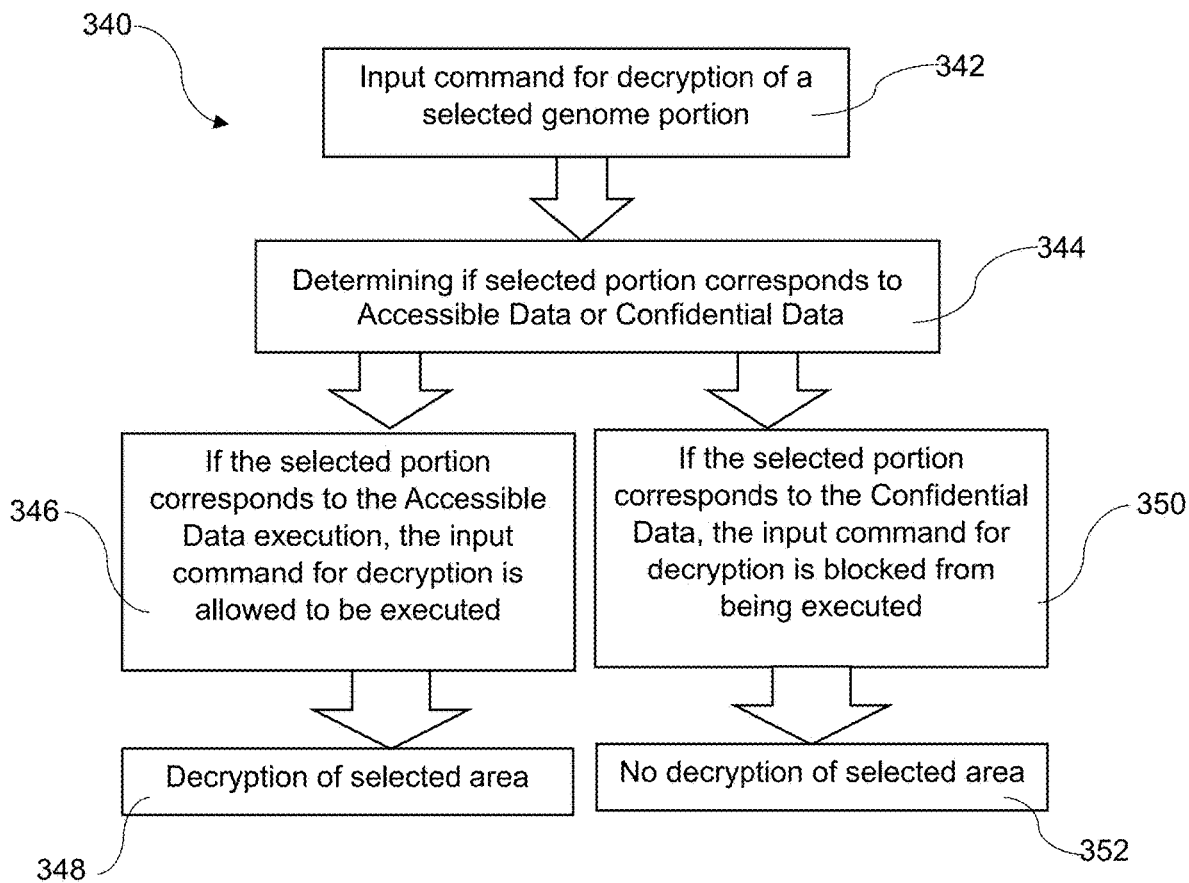
FIG. 9 is a flow diagram of the selective decryption and blocking of encrypted genomic information of the target subject performed by the system of FIG. 4 in accordance with a non-restrictive illustrative embodiment of the present disclosure.

Turning to FIG. 9, a flow diagram 340 represents the computer implementable steps executed by the system 300 when an input command 342 for decrypting a selected portion of the target subject genome stored in the data storage medium is submitted. The input command 342 is received and the area of the genome for which decryption is requested is identified. The system 300 determines at step 344 if the identified area for which decryption is requested is part of the Accessible Data or part of the Confidential Data. If the system 300 determines that the identified area is part of the Accessible Data, the input command for decryption is allowed and consequently executed at step 346 and the selected area is thus decrypted at step 348. If the system 300 determines that the identified area is part of the Confidential Data, the input command for decryption is blocked from execution at step 350 and decryption of the selected area is blocked at step 352.

With reference to FIG. 6, when a user clicks, or touch commands or otherwise inputs a command for decryption, one of the marked or identified areas 322a and 322b, these areas are decrypted while the remainder of the genome illustration 320 is blocked for decryption such that when the user inputs a command, no decryption proceeds with the remainder of the genome illustration 320 remaining inaccessible for genetic data analysis. The foregoing example is applicable to the GUIs 316 illustrated in FIGS. 7 and 8, such that only the identified image portions 330i, 330ii, 330iii 336a, 336b, 336c are decryptable and the remainder of the displayed data 328 and 332 is blocked from being decrypted and thus not accessible for genetic data analysis by the user.

When the user inputs a command for decrypting a selected area which is part of the Confidential Data, the system 300 displays via the GUI an indication that decryption of that selected area is blocked. In an embodiment, this indication comprises a non-responsive GUI when clicking on a remainder of the displayed genomic areas not forming part of the identified areas belonging to the second ranking as explained above in the examples of FIGS. 6, 7 and 8. In an embodiment, this indication comprises an audial and/or a visual cue. In an embodiment, this indication comprises a message. In an embodiment, the message informs the user that the selected area is part of the Confidential Data and decryption is unauthorized.

In an embodiment, if the user inputs commands for decrypting the Confidential Data beyond a predetermined threshold of such input commands, the system 300 executes the computer implantable step of displaying a warning indication and/or blocking any further input commands via the input interface 310 relative to the accessed stored genomic data or blocking the GUI from being used such as freezing the GUI and the like (wherein freezing refers to when the GUI is unresponsive to input commands). Thus, the system 300 includes security measures for protecting the managed data from unauthorized user commands.

In an embodiment, the first ranking based on phenotype may be based on phenotype that the target subject (i.e. patient) has or alternatively on a specific phenotype that the target subject or their representative (e.g. medical team) want to learn about but the patient does not exhibit at the time of the analysis. For example, in the case of newborn screening (NBS) the goal is to identify the disease before it leads to symptoms. Hence, for cases where newborn screening (NBS) takes advantage of genomic data and phenotypic data (e.g. biochemical imbalances), the patient would not have developed the clinical features of the disease that their data is searched about. Given NBS takes place at a population level, the present disclosure provide for protecting an individual person's genomic data that is not pertinent to the question being answered (i.e. to the diseases being targeted as part of the NBS program). In another example, if the, if my sibling has symptoms X,Y,Z which I do not yet have, I may want to do a search using these clinical features and my data to learn about pertinent diseases.

Turning back to FIG. 4, the system 300 further comprises a monitoring user device 354 comprising a monitoring device controller 356 with a device memory thereof, a user input/output interface 158 including a display interface for displaying a monitoring graphical user interface (mGUI). The monitoring device 354 can be used by a target subject, by a legal guardian of the target subject, a consultant of the target subject, a representative of the target subject, by a medical professional such as a physician working on behalf of the target subject at the like. The system 300 upon determining an input command for decrypting Confidential Data displays a message via the mGUI indicative of the received input command for decryption of the Confidential Data and prompts the monitoring user via the mGUI following the displayed message to selectively input a reactive input command via the user input/output interface 358. The reactive input command prompted by the mGUI includes a command for establishing communication between the mGUI and the GUI or for requesting that the further input commands via input interface 310 related to the encrypted genomic information stored on the data storage medium be blocked. Based on the selected input command by the monitoring user, the system 300 thus executes the command of not allowing any further input commands to be executed by the user interface 310 with regards to the encrypted genomic information and/or establishing communication between the mGUI and GUI.

The monitoring device 354 is in operative communication with the system controller 302 or with the user device 306 via a network or via the system controller 302.

For example, when a clinician user attempts to decrypt a selected area on the genomic representation displayed on their GUI as they are of the opinion that a certain variant may not have been identified and they may not be in agreement with the system 300 that the highlighted variants on the GUI of the second ranking are solely responsible for the assessed phenotypes. The clinician may click twice on the Confidential Data and a message box may open prompting the clinician to request communication with the monitoring user to receive permission to proceed. This request once input appears on the mGUI. If the monitoring user does not respond the system 300 may prompt the monitor via audial, visual, vibrational, and other computer generated cues and combinations via the input/output interface 358 to receive a response. The message displayed via the mGUI prompts the user to either request direct communication with the GUI, provide permission to the system 300 to allow the user to input a command for decrypting a selected portion of the Confidential Data or to simply block the user from further input commands related to the genomic data thus stopping the clinician from continuing their work. If the monitor selects opening a line of communication, then the clinician and the monitor can communicate directly and an informed decision can be made regarding whether or not the monitor will provide permission to the clinician to decrypt a selected area of the Confidential Data.

In an embodiment, and as shown in FIG. 4, the system 300 further comprises a monitoring controller 360 with an associated memory of processor executable code. The monitoring controller 360 is in operative communication with the system controller 302 and/or the device controller 306 via a network or via the system controller 302. Execution of the processor executable code provides the monitoring controller 302 to receive a message from the user device 306 (via a network or via the system controller 302) of an input command for decrypting Confidential Data. Based on predetermined criteria stored in the memory of the monitoring controller 360, responsive computer implementable steps are executed thereby including establishing communication with the device 306 user via the GUI. Indeed, in one non-limiting embodiment, an Artificial Intelligence (AI) chatbot is provided by the controller 360 to inquire on why a selected area of the Confidential Data is being attempted to be decrypted. Based on the chatbot communication with the user (clinician), the monitoring controller 360 will transmit a message to the system controller 302 to allow the Confidential Data to be decrypted, to continue to block decryption thereof and in the later case the monitoring controller 360 may also make a request to the system controller 302 for taking security measures such as blocking the GUI or further input commands from being inputted via the user interface 310 related to the encrypted data etc.

As shown in FIG. 5, the GUI 316 lists the second ranking list 318 in numerical order (e.g. 1., 2., 3.) of possible genetic diseases. above a certain predetermined threshold ranked for a given patient, based on their genetic information. A user can click (or via another input command) on any disease (1, 2, 3) in the list to view the genetic variants of that disease for that given patient. In an embodiment a window opens or a new page in the GUI opens to provide this information.

In an embodiment, a user may input a additional filtering criteria via an input command therefor in order for the generated list to include the diseases that are both above the threshold and that that meet the filter criteria. The filter criteria may include for example types of medical problems/classes (e.g. cancer, cardiological, neurological problems), where the user can choose the medical class of interest (filters) and access all pertinent diseases and corresponding genetic variants. Therefore, the listed diseases will be those having the predetermined threshold of the second ranking as explained above in tandem with those of the second ranking that belong the class/filter of interest.

For example, if a user wants to focus on diseases that are cancer related, the user can click on the cancer filter and then see a ranked list of disease meeting a predetermined threshold after the second ranking/or a ranked list of variants corresponding to the said diseases.

Alternatively, instead of showing the disease names, the GUI displays the list of variants corresponding to the said diseases (again ranked as variant 1, variant 2, variant 3, where variant 1 is a genetic variant of that patient that corresponds to disease 1, as ranked for that patient after the second ranking). In this example, the user may input a command (such as a click) to pick a variant and view the details of that variant and the corresponding disease. In an embodiment, the details of that variant comprises the reasons that variant was listed highly, based on the clinical/genetic information of the patient that matches the corresponding disease (i.e. Variant 1 codes for Disease 1 for example). The variants that will be accessible in this case will be the variants corresponding to diseases above the threshold. In an embodiment, the genetic variants available to access may be filtered via filtering criteria input commands based on the attributes of the genetic variants (e.g. "only display variants previously classified as pathogenic/disease causing"; "only display disease causing variants/disease causing variants in actionable genes" etc).

Generally stated and in accordance with an embodiment of the present disclosure, there is provided a computer implementable system for managing genetic information associated with a human genome of a target subject and displayed via a graphical user interface (GUI). The genetic information modulates the target subject's response to one or more therapeutic drugs when administered thereto. The encrypted genome or portions thereof of the target subject are stored on a data storage medium. A database has stored therein: (a) a list of therapeutic drugs, (b) a list of genetic information that modulates a human response to one or more of the therapeutic drugs in the list thereof. The genetic information comprises a list of genetic variants and combinations thereof. The human response comprises a list of primary therapeutic effects and secondary effects for each of the therapeutic drugs in the list thereof. The human response is also dependent to human profile data.

A user is prompted via a GUI to input data related to candidate drugs for administration to the target subject via an input interface and human profile data related to the target subject is acquired. The encrypted genome is accessed. The database is searched by automatically comparing the candidate drugs with the list of therapeutic drugs in (a) in order to identify matches therebetween so as to provide a match between the list of genetic information in (b) and the candidate drug thereby identifying candidate genetic variants that will modulate the target subject's response to the candidate drugs. The target subject genetic variants are compared to the candidate genetic variants in order to identify matches therebetween so as to provide response modulating genetic variants of the target subject (Modulating Variants).

The system determines the primary therapeutic effects and secondary effects modulated by the Modulating Variants for each of the candidate drugs based on the human profile data of the target subject. Weight scores are assigned to the determined primary therapeutic effect and secondary effects for each candidate drug based on the target subject's response to each of the candidate drugs as modulated by the Modulating Variants and additional predetermined criteria stored in the database. An overall weight score is assigned to each of the candidate drugs based on the assigned weight scores of the determined primary therapeutic effects and secondary effects. The candidate drugs are ranked based on the assigned overall weight scores.

The ranking of the candidate drugs and a visual representation of a portion or portions of the genome of the target subject that are related to the Modulating Variants are displayed via the GUI. Ranking of the candidate drugs are visually displayed to be differentiated in order of corresponding assigned overall weight score. When receiving an input command via the input interface for selective decryption of a portion or portions of the genome of the target subject it is determined if the input command for selective decryption is for the portion or portions of the genome of the target subject that are related to the Modulated Variants of the ranked candidate drugs (Accessible Data) or that are not related to the Modulated Variants of the ranked candidate drugs (Confidential Data). The portion or portions of the genome of the target subject are decrypted when determined to be part of the Accessible Data and when receiving the input command therefor. The decrypted portion or portions of the genome of the target subject of the Accessible Data are displayed via the GUI. Decryption is blocked for Confidential Data when receiving the input command therefor. The GUI indicates that decryption is blocked when receiving the input command for decryption of the Confidential Data.

Turning again to FIG. 4, in another configuration, the system 300 can be used for treatment specific genetics rather than the disease specific genetics previously described. Indeed, the system 100 matches given treatments to given patients (subject target) thus providing a patient specific treatment or medicament delivery. Accordingly, the disclosure provides for a computer implementable system 300 for managing genetic information associated with a human genome of a target subject, wherein the genetic information modulates the target subject's response to one or more therapeutic drugs when administered thereto.

Indeed, certain genetic variants can modulate the response of the human body to certain drugs, in the sense that this modulation of the response determines or influences the efficacy/effectiveness of the drug and/or the secondary effects. As is known drugs have a primary effect which is the desired (beneficial) therapeutic effect, this relates to the efficacy/efficiency of the drug; the more efficacious the drug the better for the achieving the primary effect. Many drugs also have secondary effects which refers to all other effects besides the desired primary therapeutic effect which may be either beneficial or harmful. The key is to regulate the drug dose and/or drug cocktail to maximize the beneficial effects and minimize the non-desired side effects.

As such, efficacy or effectiveness relates to the performance of the drug action according to its indication (i.e., treatment). Certain genetic variants can improve or optimize the efficacy of the drug action. When present, a variant (or combination of variants) can be linked to an optimal or poor efficacy, side effects etc Other genetic variants may have no effect on drug treatment effectiveness. Still other genetic variants may reduce or nullify the efficacy of a drug. Certain drugs independent of their efficacy ranking (high or low) may also cause secondary effects. These secondary effects can either be desired or non-desired. These secondary effects may also be classified as toxic effects (causing significant harm) or mild effects. Toxic effects may be ranked from low toxicity (migraine, indigestion, constipation, diarrhea, nausea, skin rashes) to moderate toxicity (shortness of breath, heart palpitations, memory loss) to high toxicity (organ failure, death). Mild effects can include dry mouth and the like. Indeed, the secondary effects can be ranked so as to distinguish between life threatening effects, severe effects, inconvenient effects and mild effects. Some secondary effects may be classified as beneficial or at least desired for certain patients. For example, drowsiness is desirable to a patient suffering from insomnia. Hence, providing a drug to this patient for their primary indication (e.g. anxiety) that also has the secondary effect of drowsiness is desirable for this patient if they also suffer from insomnia but non-desirable and actually harmful if they suffer from hypersomnia. Therefore, mild side effects that do not have above threshold toxicity levels and thus are detrimental to the health security of a patient can be classified as desirable or non-desirable.

A weight score is assigned to the efficacy of a drug above a predetermined threshold and effectiveness under this predetermined weight score is assigned a nil score. A weight score is assigned to secondary effects. Indeed, toxicity above a certain threshold annuls use of the medication as it is dangerous to the patient, therefore, the drug receives a nil score independent of its efficacy for its primary therapeutic effect. When the toxicity is below the predetermined threshold, the weight score is assigned based on its level of toxicity. As such, acceptable toxicity is ranked. Acceptable toxicity, unlike unacceptable toxicity (above a certain threshold) does not nullify the efficacious drug but rather negatively impacts the total weighted score which takes into consideration both the weight score of efficacy and the weight score of the secondary effects. On the other hand, a desirable secondary effect positively impacts the overall weight score.

The foregoing is exemplified in the table of FIG. 10, where five drugs (A, B, C, D, E) have been evaluated against the genetic information of a target subject. As will further be described below, the system 300 has identified genetic variants in the target subject that modulate their response to drugs A, B, C, D, E. The genetic target's response includes the efficacy of the primary effect of the drug i.e. the efficacy of the therapeutic action. A weight score is assigned to the drug based on how effective it is in light of the identified genetic variants that impact its effectiveness. The higher the effectiveness the higher the score and vice versa. In this example, the efficacy level from highest to lowest is C (score: 8), D (score: 6), A (score: 5), B (score: 4), E (score: 3). Nevertheless, each of the drugs A, B, C, D, E also have secondary effects which play a role in the overall weight score of the drug. As such, the genetic variants of the target subject also cause, increase or decrease the secondary effects. These secondary effects include effects with high toxicity above a predetermined threshold. Drugs with the foregoing effect receive a score that nullifies their efficacy score and thus they will not even be ranked. This is the case for drug C which although is highly effective for its therapeutic indication its secondary effects are highly toxic (major toxicity) to this patient and as such the drug cannot be administered as it is dangerous.

Secondary effects also include acceptable effects which are separated into undesirable mild effects or minor toxicity and desirable effects. The greater the undesirable (minor toxicity) secondary effect, the greater its negative score which means that the gene variants that the patient has increase the level of minor toxicity. The lesser the undesirable (minor toxicity) secondary effect, the lower its negative score which means that the gene variants have a low impact on increasing the level of minor toxicity. At a score of 0, the minor toxicity of this drug is neutralized i.e., this minor toxicity is inexistant or substantially lowered that it is now negligeable. The greater the desired secondary effect, the greater its positive score which means that the level of the beneficial secondary effects are increased by the gene variants. In an embodiment, a greater positive score is assigned to the presence of a certain secondary effect that is desired by the patient. For example, a patient suffering for insomnia places a lot of value to the drowsiness. Thus, if the genetic variant has a positive impact on a given drug causing drowsiness, then this will receive a higher score as compared to another drug that does not cause drowsiness or that is not impacted in a positive way by the genetic variants so that there is greater drowsiness. Of course, drowsiness levels can be ranked and as such, a high level of drowsiness (extreme drowsiness) can be categorized as undesirable minor toxicity and thus will receive a negative score or even be moved to the unacceptable secondary effect category and remove the medication from the list of possible options. The lesser the desired secondary effect, the lesser its positive score which means that the level of the beneficial secondary effects are decreased by the gene variants. At a score of 0, the desired secondary effects are annulled (or lowered to the level of being negligible) by the gene variants.

Regarding the above, it is the patient or their phusician that may answer the prompted questions (for one or more types of possible side-effects) before the analysis is performed. In an example, this questioning may be through the physician who then adds the info on the GUI app, or through the patient directly interacting with the product or even via a monitoring controller that already has in memory certain answers from the patient and can inform the system 300 automatically and furthermore, request additional data from the physician or the patient directly directly to add data on how the patient feels about a side-effect for which the controller does not have data stored in its memory)

The foregoing scores of the drugs are combined and added based on their weighted score value to the weighted efficacy score to provide an overall or total weighted score on the basis of which the drugs will be ranked from the highest scoring the lowest scoring. For example, drug B has the fourth highest efficacy score (4) out of the 5 drugs but the highest desirable secondary effect score (+6) due to the fact that this secondary effect is very beneficial to this patient, and a low negative score (−1) for the undesirable effect or minor toxicity of drug B. Drug B receives the highest overall weighted score and thus is ranked $1^{st}$ for this patient. For another patient with similar gene variants, it is possible that the secondary effect of B is not desired but rather the secondary effect of A and as such, the overall weighted score would be different, increasing the total score for A and decreasing the total score for B, thus making drug A the top ranking drug (if all other factors remain the same). Accordingly, the treatment is patient specific based on both objective (medical health indications) and subjective (patient desired) factors.

Weight score assigning also provides a target subject and/or monitor the option to pre-select effectiveness, secondary side-effects types and give more weight thereto when calculating the total weight.

Figure 11:
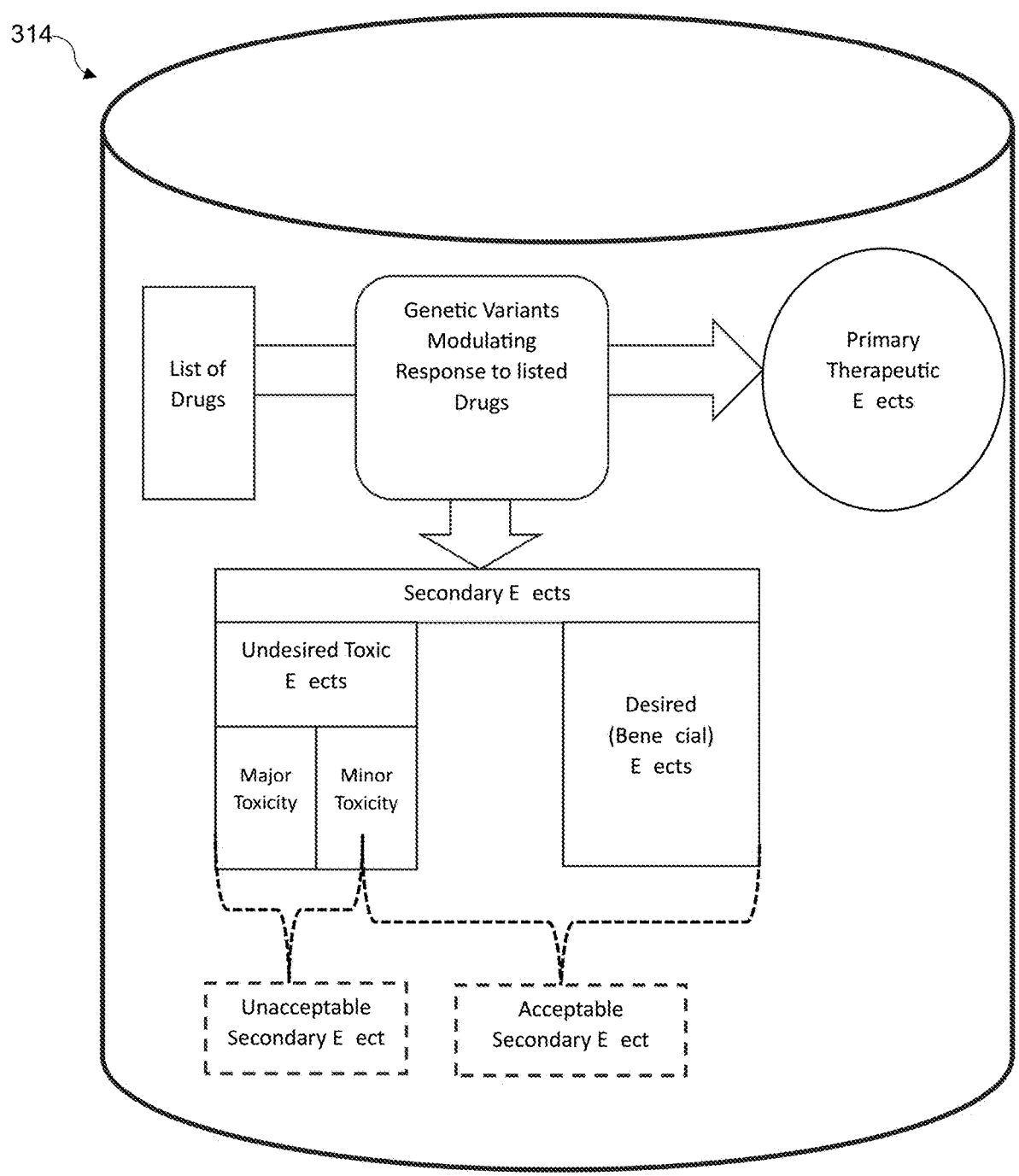
FIG. 11 is a schematic illustration of the database of FIG. 4 and a flow diagram showing the evaluation of the therapeutic drugs for the ranking thereof performed by the system of FIG. 4 in accordance with a non-restrictive illustrative embodiment of the present disclosure.

FIG. 10 will be described taking into consideration the configuration of the system 300 for managing genetic information associated with a human genome of a target subject, wherein the genetic information modulates the target subject's response to one or more therapeutic drugs when administered thereto. Accordingly, the database 314 shown in FIG. 11 comprises data with respect to a series of drugs as well as to genetic variants that modulate a human response to each of the drugs. This human response includes primary therapeutic effects and secondary effects. Secondary effects include undesirable toxic effects and desired/beneficial effects. The toxic effects include high or major toxicity and low/mild or minor toxicity. The secondary effects can be divided into unacceptable and acceptable secondary effects. Unacceptable effects are effects that are objectively unacceptable to the health of the patient as well as those effects which are subjectively undesirable to the patient. These include objectively minor toxic effects that are subjectively completely unacceptable to the patient. Nevertheless, these same minor toxic effects although undesired would be otherwise acceptable to other patients. Acceptable effects also include the desired secondary effects.

Database 314 comprises a stored memory of the drugs and the genetic variants that modulate the human response to increase/decrease efficacy and to increase or decrease secondary effects. The memory of the database comprises objective data. Patient specific data regarding subjective preferences (unacceptable or acceptable minor toxicity) and desirable secondary effects are stored in the database thereby tailoring the subjective preferences to the needs of each patient.

Usually, a clinician following diagnosis of a given patient (target subject) has evaluated several possible therapeutic drugs having considered standard practice (including drug interaction, comorbidities etc.). Indeed, in other cases, the clinician can search using various search tools for the most appropriate drugs regarding a patient. The clinician needs to take into consideration prior clinical information such as diagnosis, previous treatments, demographic information, guidelines, drug interactions with other drugs the patient is currently on. The present disclosure provides for the integration of this clinical data when generating the output of system 100 as will be described below and for FIGS. 10 and 11.

In any event, the clinician will have a list of possible drugs that are appropriate for this patient based on the diagnosis and having considered other patient data (age, weight, height, gender etc.) The system 300 provides ranks the selected based on the genetic information of the target subject. Therefore, instead of listing diseases, the system 300 provides for listing treatments ranked highly for a given patient, based on their clinical and genetic information. Moreover, based on this ranking the system allows access to only part of the patient's DNA, keeping the rest as encrypted/inaccessible. Similar to a list of diseases linked to at least one reference genome or portions thereof, the treatments (drugs) are linked to at least one reference genome or portions thereof.

In an embodiment, effectiveness/efficacy can be displayed via the GUI by various image representations including visual cues such as colors for example. The visual cues can further indicate the type of which effectiveness, e.g. by area of clinical focus: for example, if a disease presents with progressive muscular and cognitive complications, one can differentiate via visual cues the effectiveness of a drug as effectiveness for muscular progression vs. effectiveness for cognitive disease.

As mentioned above, the types of secondary effects mentioned above can be differentiated by type via image representations such as visual cues including colours, symbols and the like.

Side effects can be separated in major (objectively undesirable for the patient due to objective health factors) and minor (all the other side effects that are not part of the major list). In an embodiment, the system 300 prompts the target subject via the mGUI a list of minor side effects and prompts the target subject to select via input commands which of these minor side effects are desired or undesired. The system 100 assigns a corresponding weight score based on this selection to reflect the target patients selection.

In an embodiment, weights scores for both primary effectiveness and both major or minor secondary effects may also be based on knowledge about quick vs slow metabolizer enzymes, toxicity in a specific genetic background (where slow metabolizers would need a lower concentration of the drug so that its concentration does not end up being too high in the body) and other relevant data. Indeed, clinical data are factored in the probability of the variant causing toxicity/effectiveness. Phenotypic information for patients in treatment ranking may include demographics, other medications they are taking, symptoms, diagnosis, side-effects to avoid/ and for drugs: mechanism of action, SEs, guidelines for characteristics of patient who should have that drug based on diagnosis, drug-drug interactions info and other relevant factors programmed into the weight scoring scheme and updated.

In an embodiment, this clinical data can include age, diagnosis, allergies, drugs patient is already taking, transcriptomics/metabolomics data, as previously described herein.

In an embodiment, the data base also has a drug profile for each drug listed. The drug profile may include is chemical information, brand names, the clinical information of the drug (e.g. diagnosis/disease or diseases it is used for; that it is indicated for young vs. older patients, without arrhythmias) etc. Indeed certain medications can be exacerbated by the said medication). Drug profiles may include information that one drug cannot be combined with another drug due to drug-drug reactions. The drug profile may also include information that it works best for subjects who have a given biochemical or transcriptomic signature X.

Before the system 300 ranks the candidate medication, different weights for the different factors are taken into consideration. In an embodiment, the user may modulate the weight scoring scheme by inputting into the database additional target subject factors include or modulating the weight of certain factors. For example, the user can decide to weigh in more on the guidelines of what medication to use based on the patient's age, while another user weighs in more on the genetic data and so on.

In another embodiment, the system 300 provides the user to request via input command to not rank certain drugs based on filtering factors. For example, the user can specify which drug that the patient is taking and that this drug should not be changed (i.e. a "fixed drug") and thus any medication with serious contraindications due to the fixed drug will not show up on the list. The user can also add or specify other filtering factors which may cause certain drugs to be removed from the list and not be ranked. In another embodiment, the system 300 provides the option of displaying all the drugs by ranking order yet, certain drugs which should be removed from the treatment regimen (based on the various factors and overall scores described herein) are visually indicated as such. The drugs the system 300 considers "prohibited" can include additional information displayed via the GUI including the reasons for this prohibition, in which conditions the prohibited drug would be allowable (e.g. removing another drug that interacts with it)

Once the candidate drugs (medications) have been ranked, the system 300 (directly or via user input command therefor) displays all the minor side effects (minor, as major side effects would remove the drug from the list) to the target subject via a GUI. Minor side effects are displayed based on a ranking thereof. In an embodiment, all minor side effects even at negligible levels would be listed. In an embodiment, minor side effects at negligible levels would not be listed. The minor side effects need to be impactful to the patient and these minor side effects above a predetermined level will only be displayed to the target subject. Thus, the target subject being prompted via the mGUI can via input commands select which of the minor side effects are desirable and which are not desirable. The system 300 will then re-rank the drugs accordingly and display the results to the user via the GUI.

The selection of desired or undesirable minor side effects can be provided in various ways. For example, one can use a vector with direction and magnitude here. The user can be asked to assign direction (+ or −) and magnitude of impact for each listed effect. In another example, the desirable side-effects are ranked in terms of importance and the undesirable side-effects are also ranked in terms of importance. As such, selection is not a yes or no answer but a gradient or point system or preference scale system as can be contemplated within the scope of the disclosure.

The user will only have access to the genetic variants that modulate a response to the listed drugs. For example, in FIG. 10, the system 300 after consideration of the desired secondary effects and effectiveness above a certain threshold may also display the top-three ranking drugs (drugs B, A, D). As explained for the listed second ranking diseases, the user will only be allowed to decrypt the genetic variants modulate responses for drugs B, A and D.

The drug profile can be matched with the human profile data. Therefore, the system during applying weight scores. Hence when you are performing the search, you match the clinical characteristics of the patient at hand (age, diagnosis, biochemical info etc) against those of the clinical info of the drugs in the database. Can also much desired side-effects and match against side-effects that are important for the patient to avoid. All these are part of the clinical info of the patient searched against the drug info in the database. Also, you much the genetics of the patient against the genetic information that is known to be important for that drug in the database. You can then click on the top drug and see which were the clinical and genetic information of the patient that ended up prioritizing the said drug for them Generally stated and in accordance with an embodiment, there is provided a computer implementable system for managing genetic information associated with a human genome of a target subject and displayed via a graphical user interface (GUI). The encrypted genome or portions thereof of the target subject (target genetic profile) is stored in a data storage. A database has stored therein a plurality of patient profiles. Each of the patient profiles comprises a clinical profile and a genetic profile. A user is prompted via the GUI to input data related to a target clinical profile of target of the target subject via an input interface.

The system automatically compares the target clinical profile with the clinical profile of the patients stored in the database in order to provide first clusters of the patient clinical profiles that have a degree of similarity above a predetermined threshold with the target clinical profile. In an embodiment, linical profile can be referring to history, symptoms, signs, physical exam, transcriptomics, metabolomics data, imaging data or other clinical laboratory data Each of the first clusters has respective clinical profiles of the patients with a degree of similarity therebetween. Each of the first clusters is ranked (first ranking) according to their degree of similarity with the target clinical profile. The system automatically compares the target genetic profile to the genetic profiles of the patients stored in the database in order to provide second clusters of the patient genetic profiles within the first clusters that have a degree of similarity above a predetermined threshold with the target genetic profile. Each of the second clusters has respective genetic profiles of the patients with a degree of similarity therebetween. In an embodiment the degree of similarity may be determined based on the entire genome or a preselected part of the genome and might represent population/ethnic structure or disease specific similarity For example using polygenic risk score (PRS) which consists of variants specific to a given disease, the matching will be disease based but if the variants were just stratifying you based on whether you are more Sicilian or Norwegian it would be based on population structure Each of the second clusters is ranked (second ranking) according to their degree of similarity with the target genetic profile. Each of the second clusters is related to a portion or portions of the genome of the target subject. The system displays via the GUI the second clusters and/or a visual representation of the portion or portions of the genome of the target subject related to the second clusters. The second ranking is visually displayed to be differentiated. The visual representation of the portion or portions of the genome of the target subject that are related to the second ranking are visually displayed in ranking order.

When receiving an input command via the input interface for selective decryption of a portion or portions of the genome of the target subject it is determined if the input command for selective decryption is for the portion or portions of the genome of the target subject that are related to the second clusters (Accessible Data) or that are not related to the second clusters (Confidential Data). The system decrypts the portion or portions of the genome of the target subject determined to be part of the Accessible Data when receiving the input command therefor. The system displays the decrypted portion or portions of the genome of the target subject of the Accessible Data via the GUI. The system blocks decryption of the Confidential Data when receiving the input command therefor. The system displays via the GUI an indication that decryption is blocked when receiving the input command for decryption of the Confidential Data.

The system 300 provides the option for a patient (target subject) to give access to different monitors to their selected data. A patient can invite different physicians, or a physician can invite a patient to monitor or modulate the system parameters via the mGUI. Once the invited party is linked into the system 300 via their invited party GUI (iGUI which can include the mGUI) the preferences of the patient as to what type of genomic data can be accessed may differ from physician to physician (e.g. the automated preferences for MD #1 access may be different than for user/MD #2). Indeed, there system 300 provides the option for the patient to refine what is accessible based on the clinical search terms (e.g. MD #1 may be able to search for cancer but MD #2 only for treatable cancer or not for cancer at all and be authorized to search only for diabetes as part of the input for the first ranking). As such, the target subject can selectively modulate the filtering criteria for filtering any of the outputs provided herein.

As such, the filtering criteria inputs via the GUI set rules as to what will form part of the Acessible Data and Confidential Data. Various users of the system 300 can be subject to different rules set by the selected filtering criteria entered by the target subject via input commands.

In an embodiment the ranking process may be blocked (by a computer implementable step or by an input command therefor including pre-entered filtering criteria) at the phenotype entry. For example, the target subject can set rules via filtering criteria for a user not to enter certain assessed phenotypes and if these are entered, the system 300 will block the system and optionally communicate with the monitor/target subject as provided herein when trying to access Confidential Data.

Ranking of genetic diseases or therapeutic drugs within the context provided above can also be executed by clustering. Indeed, a target subject is compared to a patient population at both the clinical level (first ranking) and then at the genetic level (second ranking) to produce clusters of patients ranked according to degree of similarity with the target subject. These clusters of patients may have a disease in common or a therapeutic treatment in common and thus the latter is similarly ranked. In another embodiment, the disease is not common to all members/patients of the cluster. In another embodiment, a trend is identified for each cluster the approach a trend in order to determine if the cluster is just noise or represents significant similarity that meets established standards based on statistical and ML methods, and a minimum default.

Figure 12:
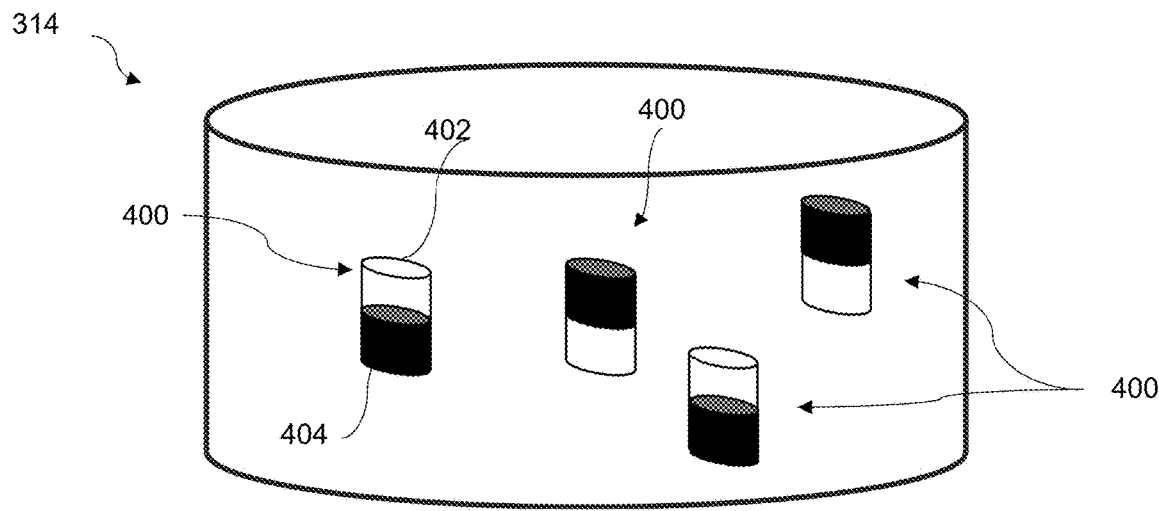
FIG. 12 is a schematic illustration of the database of FIG. 4 comprising patient profiles with respective clinical profiles and genetic profiles in accordance with a non-restrictive illustrative embodiment of the present disclosure.

Turning to FIG. 12, there is shown the database 314 comprising a plurality of patient profiles 400 including clinical profiles 402 (clinical data, phenotypes, age, weight, gender etc.) and genetic profiles 404 (e.g. genetic variants, genomic data). In an embodiment, the foregoing configuration of the database is used by the system to provide clustering patient profiles, where a cluster corresponds to people with the same disease (or for which a medical condition trend has been determined) (or undergoing the same treatment for the same disease.

Figure 13:
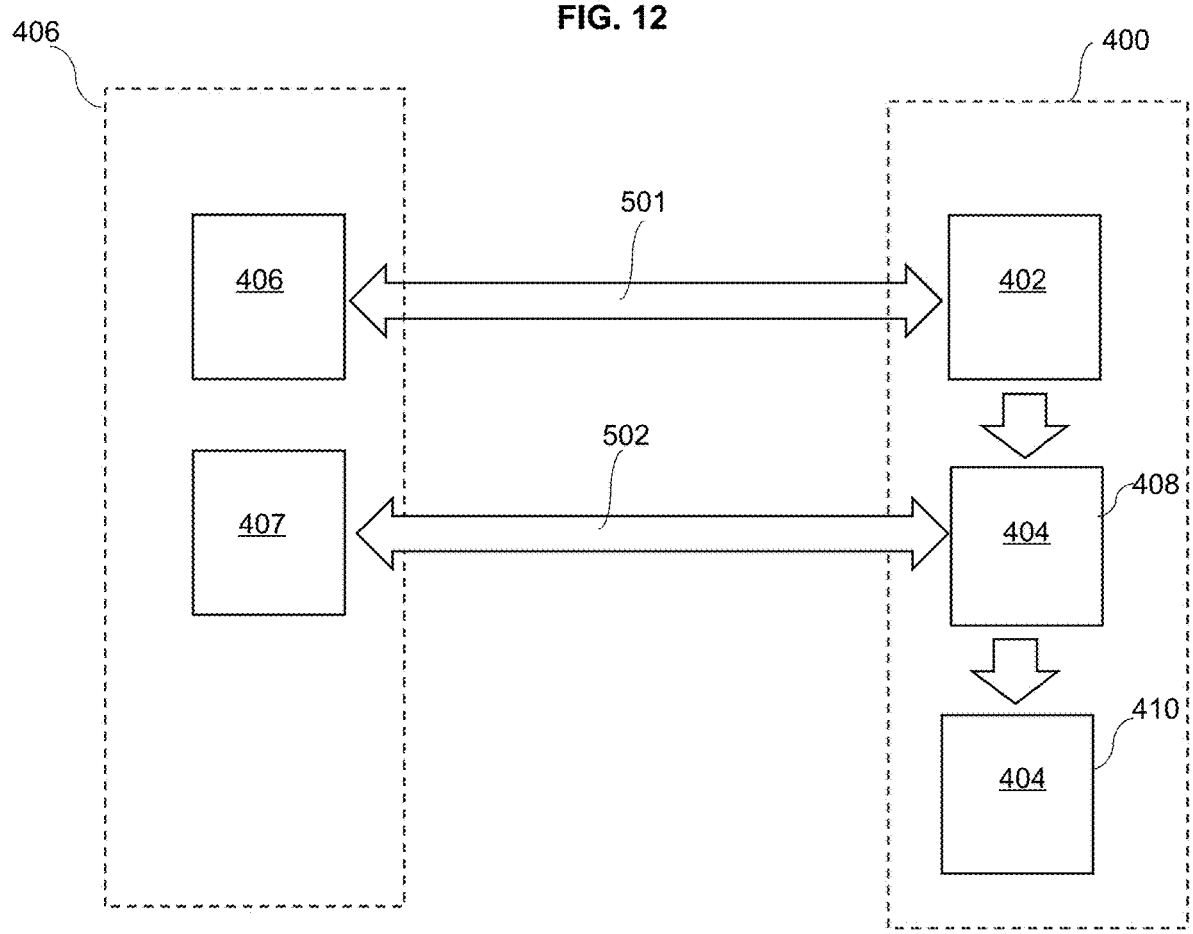
FIG. 13 is a flow diagram showing the comparison of the target subject profile with the patient profiles in the database of FIG. 12 as performed by the performed by the system of FIG. 4 in accordance with a non-restrictive illustrative embodiment of the present disclosure.

As shown in shown in FIG. 13, the profile 405 of a target subject patient is compared to the profiles 400 of the group of patients. This comparison has two steps. A step 501, the clinical profile 405 of the target subject is compared to the clinical profiles 402 of the stored patient profiles 400 producing clusters 408 of patient clinical profiles 402 that have a high degree of similarity to the target clinical profile 405. At step 502, the genetic profile 407 of the target subject profile is compared to the genetic profiles 404 in the cluster 408 producing a sub-cluster thereof, namely cluster 410 which clusters the genetic profiles 404 of the first cluster 408 that have a high degree of similarity with the target genetic profile 407.

In an embodiment, cluster 410 may be related to a genetic disease (i.e., the cluster includes patients having the same disease) and thus this related genetic disease is likely present, or predicted to be present in the target subject and thus this related genetic disease needs to be considered or confirmed in the target subject. In another embodiment, the cluster 410 refers to a therapeutic treatment for a genetic disease (i.e., the cluster includes patients undergoing the same treatment for the same disease or having similar response to a given treatment). It should be noted, and without limitation to any statement herein, that a genetic disease includes without limitation monogenic/Mendelian diseases as well as more common diseases that have a genetic component. In another embodiment, the cluster 410 refers to treatment or treatment response for a given disease linked to the genome or parts of the genome (including one or more genetic variants)

Figure 14:
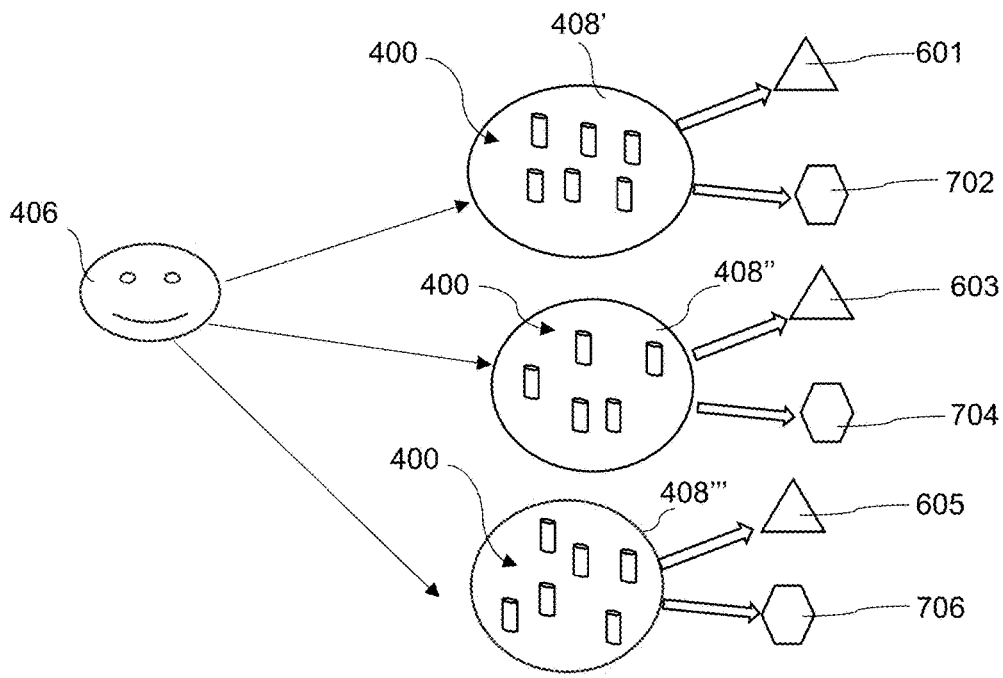
FIG. 14 is a schematic representation showing the comparison of the target subject clinical profile with the patient clinical profiles in the database of FIG. 12 for producing the first clusters as performed by the performed by the system of FIG. 4 in accordance with a non-restrictive illustrative embodiment of the present disclosure.

As further exemplified in FIG. 14, the system 300 at step 501 clusters the profiles 400 having the greatest similarity to the patient 406 based on the clinical profiles 402. Therefore, a plurality of clusters 408', 408" and 408''' are provided. In this example, the clusters 408', 408" and 408''' have different degrees of similarity. For example, cluster 408' has the highest degree of similarity (top ranking) and 408''' has the lowest degree of similarity (lowest ranking). Each cluster represents a potential disease, 601, 603, 605, therefore, candidate diseases 601, 603, 605 are ranked based on the degree of similarity between a clinical profile 402 clusters and the clinical profile 405 of the target patient providing a first ranking of possible genetic diseases. Each cluster may also represent a potential therapeutic treatment, therefore, candidate drugs 702, 704, 706, are ranked based on the degree of similarity between a clinical profile 402 clusters and the clinical profile 405 of the target patient providing a first ranking of possible therapeutic drugs or class of drugs (e.g. cholesterol lowering medication or antidepressants).

Figure 15:
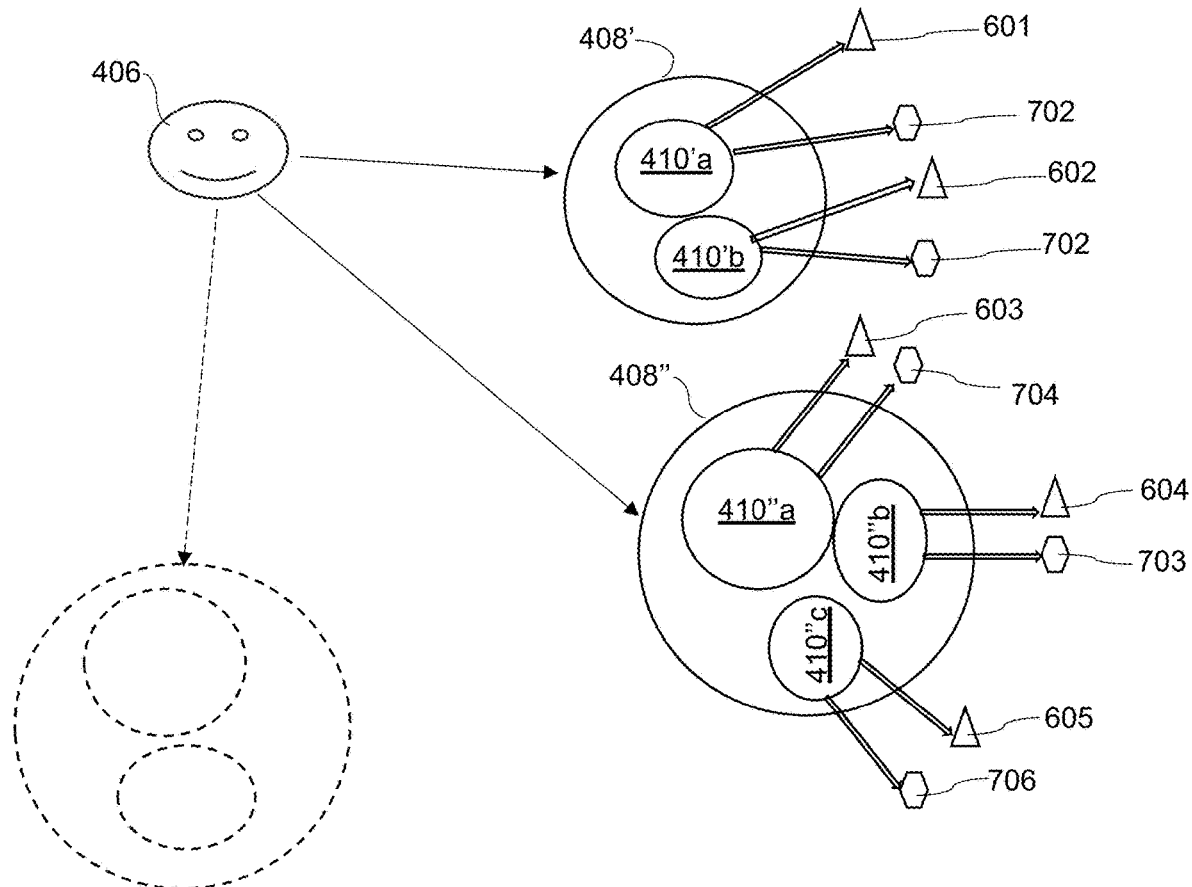
FIG. 15 is a schematic representation showing the comparison of the target subject genetic profile with the patient genetic profiles in the database of FIG. 12 for producing the second clusters as performed by the performed by the system of FIG. 4 in accordance with a non-restrictive illustrative embodiment of the present disclosure.

Turning to FIG. 15 the genetic profile 407 of the target subject is compared to the genetic profiles 404 in each cluster for example, 408' and 408" (shown in the Figure) to provide a sub-cluster (e.g., 410'a 410'b, 410"a, 410"b, 410'''c). Each of the sub-clusters have a degree of similarity with the genetic profile of the target subject 406 and each cluster is related to a genetic disease, 601, 602, 603, 604, 605. In this example, there are two additional diseases listed but it should be noted that in another example, the same diseases will be listed. Indeed, a greater number of diseases listed may also be due to genetic variations within a certain disease categorizing it into one or more sub-groups or the fact that other diseases that could not be identified at the clinical level were identified at the genetic level. The sub-clusters 410 will be ranked in order of degree of similarity thereby ranking the diseases (second ranking). The user can select a given cluster (or sub-cluster) and with input commands can access this cluster to evaluate why it ranked higher than another cluster. For example, a user can click on a given cluster 410'a uncover important genetic information that lead to ranking cluster 410'a higher than cluster 410"b. The foregoing is applicable to the second ranking of therapeutic diseases where patients are clustered based on undergoing the same therapeutic treatment and/or based on a response to the same treatment among the clustered patients namely drugs, 702, 703, 704, 706. As shown here, two different clusters may be undergoing the same treatment but have differences between them at the genetic level causing them to be clustered apart when compared to the target genetic profile.

The clustering of patients genetically may correspond to genetic similarity based on common genetic background. In an embodiment the degree of similarity may be determined based on the entire genome or a pre-selected part of the genome and might represent population/ethnic structure or disease specific similarity For example using polygenic risk score (PRS) which consists of variants specific to a given disease, the matching will be disease based but if the variants were just stratifying the matching would be based on whether one is more Sicilian or Norwegian and as such it would be based on population structure.

Using genetic stratification for population stratification can be useful. Genetic clustering is well understood by those having skill in the art. The system provides for clustering without user accessing the genetic data of the target subject and being allowed to decrypt genetic based on the rankings. In other words, the target subject will have variants that have a degree of similarity (high, low, intermediate) with genetic clusters of patients. Each of these genetic clusters of patients correspond to a disease, since the patient profiles within a given genetic cluster share this disease in common, share variants in common and those variants have a degree of similarity to the variants of the target subject. As such, the higher this similarity, the higher the ranking of this cluster. As each ranked cluster has a degree of similarity to variants of the target subject, the system 300 will allow the user to decrypt only the genomic portions corresponding to these variants which share a degree of similarity to the ranked clusters.

Therefore, the output of the system 300 would be a list of ranked clusters (or the list of genetic variants that correspond to these ranked clusters/defining each cluster; or list of treatments that correspond to these ranked clusters or list of treatments of (some of) the patients in the cluster meeting specific threshold/stats/ML standards).

In one example, the focus is patients in the same cluster who respond to the same medication. Based on statistical or machine learning (ML) approaches, the system 300 determines that a given cluster X is pertinent to the target subject in terms of treatment leading to cluster X being ranked highly. The user can access the cluster (via an input command therefor) to peruse data related to cluster genetic variants/treatments. Clustering for treatment purposes may be based on clinical information and genetic variants that are specific to a specific class of treatments (rather than all treatments). In this case the clustering could for example group patients with clinical and genetic variants pertinent to antidepressants, rather than a specific antidepressant.

Therefore, the target subject's clinical profile is compared to the clinical profiles in the database to produce first clusters. Then the target subject's genome or parts of genome is compared to the genome or parts of genome in the each of the first clusters to produce second clusters based on genetic similarity. The genetic similarity of a cluster with the genome is due to certain portions of the target subject's genome being similar to that cluster, therefore these portions in the genome of the target subject are of interest. As such, each second cluster has a high degree of similarity with genetic variants of the target subject's encrypted genetic data and thus system 300 provides for decrypting (Accessible Data) these portions but not decrypting the other positions (Confidential Data) as provided herein. It should be noted that the genetic profile of the target may be limited at the onset, in the comparison/similarity search. For example, a user may want to focus on disease specific variants or genetic variants known to be related to treatment response modulation.

Generally stated and in accordance with an embodiment of the disclosure, there is provided a computer implementable system for managing genetic information associated with a human genome of a target subject and displayed via a graphical user interface (GUI). The system comprises a user device comprising a device controller with an associated memory, an input interface, and a display interface for displaying the GUI. A data storage medium has stored therein an encrypted genome or portions thereof of the target subject (target genetic profile). A database has stored therein a plurality of patient profiles. Each of the patient profiles comprises a clinical profile and a genetic profile. A system controller is in communication with the user device and the database.

The system prompts a user via the GUI to input data related to a target clinical profile of the target subject via the input interface, acquires the input data related to the target clinical profile, and accesses the encrypted genome or portions thereof of the target subject stored in the data storage medium. The system automatically compares the target clinical and genetic profiles with the clinical and genetic profile of the patients stored in the database in order to provide clusters of the patient clinical and genetic profiles that have a degree of similarity above a predetermined threshold with the target clinical and genetic profile. Each of the clusters having respective clinical and genetic profiles of the patients with a degree of similarity therebetween. Each of the clusters is ranked according to their degree of similarity with the target clinical and genetic profiles.

The system displays via the GUI the clusters and/or a visual representation of the portion or portions of the genome of the target subject related to the clusters. The ranking is visually displayed to be differentiated. The visual representation of the portion or portions of the genome of the target subject that are related to the clusters are visually displayed in ranking order. The system provides for receiving an input command via the input interface for selective decryption of a portion or portions of the genome of the target subject. The system determines if the input command for selective decryption is for the portion or portions of the genome of the target subject that are related to the second clusters (Accessible Data) or that are not related to the second clusters (Confidential Data). The system decrypts the portion or portions of the genome of the target subject if determined to be part of the Accessible Data when receiving the input command therefor. The system displays the decrypted portion or portions of the genome of the target subject of the Accessible Data via the GUI. The system blocks decryption of the Confidential Data when receiving the input command therefor. The system displays via the GUI an indication that decryption is blocked when receiving the input command for decryption of the Confidential Data.

In an embodiment, steps 501 (clinical profile comparison) and 502 (genetic profile comparison) are performed simultaneously. In an embodiment, there is provided a one step ranking combining both clinical and genetic data, for the disease database approach, which provides diseases ranked (and the variants pertinent to each of these diseases ranked accordingly). In an embodiment, the database comprises a list of treatments that correspond to each disease. As such, we diseases can be ranked accordingly their treatments i.e. in the order of the treatment that corresponds to the first disease, second disease and so on and so forth.

The foregoing is applicable to clustering, a target subject would be matched to different clusters based on the clinical and genetic profile data of this target subject as compared to the clinical and genetic profile data of the patients in the database.

Figure 16:
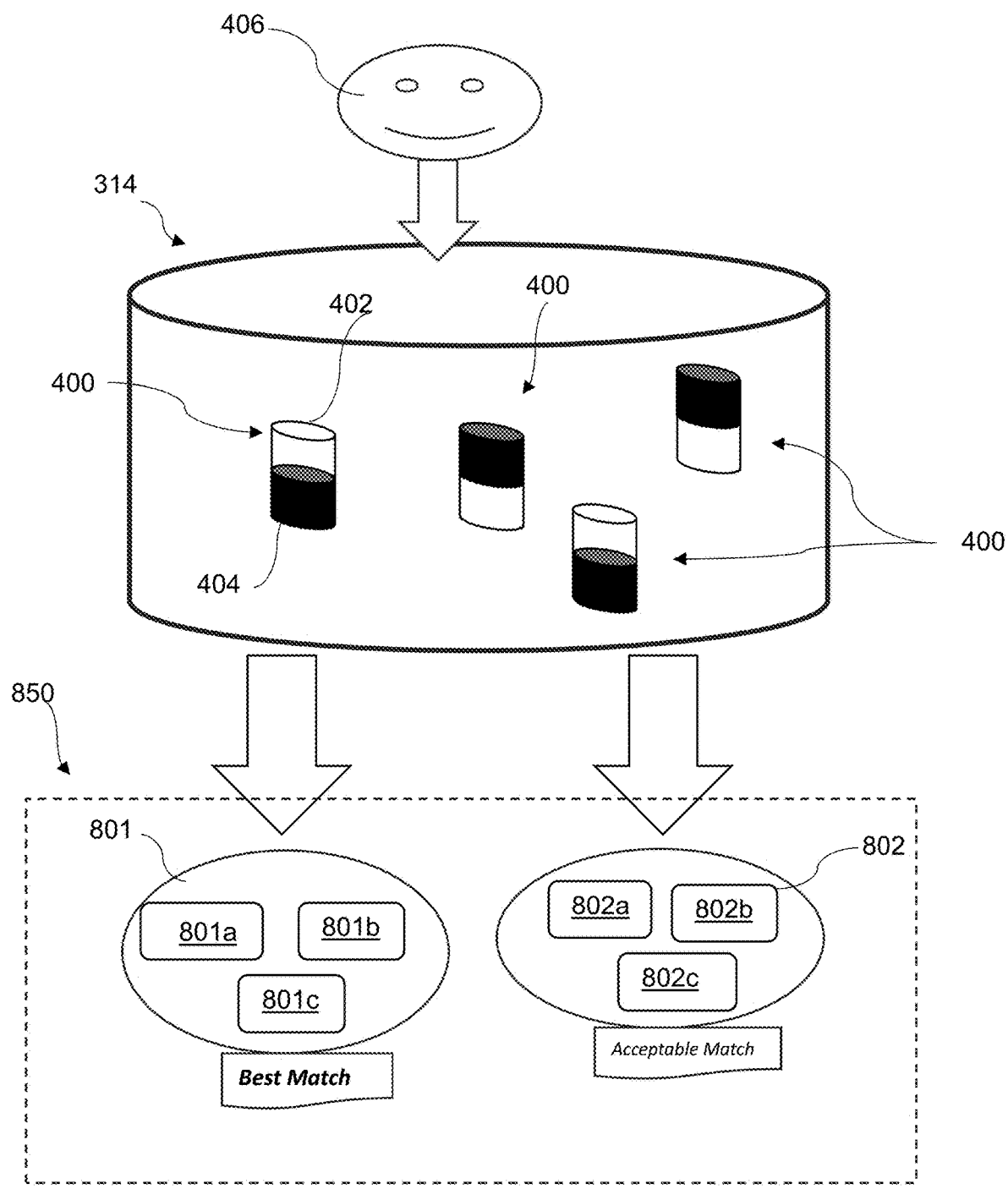
FIG. 16 is a schematic representation showing the comparison of the target subject genetic profile with the patient genetic profiles in the database for producing clusters as performed by the system of FIG. 4 in accordance with a non-restrictive illustrative embodiment of the present disclosure

In an example shown in the schematic representation of FIG. 16, target subject profile is 406 compared to the patient profiles 400 in the database 314 in order to produce clusters. The clinical profile 405 is compared to the clinical profiles 402 of the patient profiles 400 and simultaneously the genetic profile 407 of the target subject is compared to the clinical profiles 404 of the patient profiles 400. Two clusters 801 and 802 are produced and displayed via the GUI 850. The clusters are ranked and their rank is visually indicated, in this case by the labels "Best Match" and "Acceptable Match". Cluster 801 has a high degree of similarity between the patient profiles 400 and the target profile 406 (Best Match). Cluster 802 has a moderate degree of similarity between the patient profiles 400 and the target profile 406 (Acceptable Match). The Best Match cluster 801 is of course, the top ranking cluster. Clusters 801 and 802 may contain patients of different subtypes of the same disease.

The user can peruse the genetics defining each group of patients based on ML/stats by clicking (or via another input command) on each cluster 801, 802.

The user may also select other features 801a, 801b, 801c, 802a, 802b 802c each cluster 801, 802 via input commands to review the data. For example, features, 801a, 802a display the most medication or medication that based on stats/ML the related cluster 801, 802 best responds to. For example, in cluster 801, the most common medication is Drug-I and for cluster 802, the most common medication is Drug-II. In another embodiment, cluster 801 may have more than one most common drug and include both Drug-I and Drug-III as the most common. In this example, features 801b and 802b, when selected display the drug that each cluster 801, 802 best responds to. In this example, features 801b and 802b, when selected display the drug that is the most toxic to each cluster 801, 802.

The system 300 thus provides a ranked "best responding medication" list, providing the user to find you can find which drugs the target subject would respond to and thereby explore the genetic variants that contributed to this. The foregoing providing for prioritizing medication or avoiding medication via the system 300 as provided hereinabove.

In an embodiment, a plurality of patients participate in the clustering process, namely each given target subject and all other patients already part of the database 314. Each given target subject would select their options being prompted by the GUI and entering their selected filtering criteria via their input interface. When a target subject T1 matches with a cluster C1, the user will be able to access the genetic information of target subject T1 that is pertinent to cluster C1, if the user has been authorized by target subject T1 (via the filtering criteria) to be allowed to access this genetic information (i.e. allowed to decrypt). If the user attempts to access specific clinical/genetic profile information (400/402/404) of a given patient P1 in that same cluster C1, access thereto may be allowed or blocked depending on the filtering criteria input provided by the patient P1. Indeed, target subjects can become database patients when allowing for their data to be permanently stored in the database to create a patient profile 400. As such, the filtering criteria herein comprises data management rules which are selected by the target subjects Depending on the preferences that individual has indicated, the physician/clinician (i.e. user) may be granted access or be blocked.

It should be noted that the various components and features of the embodiments described above can be combined in a variety of ways so as to provide other non-illustrated embodiments within the scope of the disclosure. As such, it is to be understood that the disclosure is not limited in its application to the details of construction and parts illustrated in the accompanying drawings and described hereinabove. The disclosure is capable of other embodiments and of being practiced in various ways. It is also to be understood that the phraseology or terminology used herein is for the purpose of description and not limitation. Hence, although the present disclosure has been described hereinabove by way of embodiments thereof, it can be modified, without departing from the spirit, scope and nature of the subject disclosure as defined herein and in the appended claims.

What is claimed is:

1. A computer implementable system for managing genetic information associated with a human genome of a target subject and displayed via a graphical user interface (GUI), the system comprising:
a user device comprising a device controller with an associated memory, an input interface, and a display interface for displaying the GUI;
a data storage medium having stored therein an encrypted genome or portions thereof of the target subject;
a database having stored therein: (a) genetic diseases linked at least in part to at least one relevant region in the genome of the target subject and at least in part to at least one phenotypic characteristic, and (b) at least one reference genome or portions thereof;
a system controller in communication with the user device and the database, the system controller having a processor with an associated memory of processor executable code for being executed by the system controller or for being downloaded into the memory of the user device controller to be executed thereby or to be executed synergistically by a combination of the system controller and the user device controller, wherein execution of the processor executable code by the system controller or by the user device controller or by the combination thereof synergistically provides for the system controller or the user device controller or the combination thereof with performing real time computer-implementable steps comprising:
prompting a user via the GUI to input data related to assessed phenotypes of the target subject via the input interface;
acquiring the input data related to the assessed phenotypes;
accessing the encrypted genome or portions thereof of the target subject stored in the data storage medium;
searching the database by automatically comparing the assessed phenotypes of the target subject with (a) in the database in order to provide one or more matches between the assessed phenotypes and a genetic disease stored in the database thereby providing in real time a first ranking list of possible genetic diseases, each possible genetic disease being related to at least one genetic variant indicative of that disease;
identifying genetic variants in the encrypted genome or portions thereof of the target subject by automatically comparing it to (b) thereby providing a first ranking list of possible genetic diseases;
simultaneously assigning an overall weight score to each of the identified genetic variants in the first ranking list based on predetermined criteria,
adjusting the first ranking list of possible genetic diseases by a re-ranking thereof based on the assigned overall weight score;
providing a second ranking list of possible genetic diseases based on the re-ranking of the first ranking, the second ranking comprising a list of possible genetic diseases above a predetermined overall weight score threshold;
displaying via the GUI the second ranking list of possible genetic diseases and/or a visual representation of a portion or portions of the genome of the target subject that are related to the second ranking, wherein the second ranking list of possible genetic diseases are visually displayed to be differentiated in order of corresponding assigned overall weight score, wherein the visual representation of the portion or portions of the genome of the target subject that are related to the second ranking are visually displayed in order of corresponding overall weight score of the possible genetic diseases,
providing for receiving an input command via the input interface for selective decryption of a portion or portions of the genome of the target subject;
determining if the input command for selective decryption is for the portion or portions of the genome of the target subject that are related to the second ranking (Accessible Data) or that are not related to the second ranking (Confidential Data);
decrypting the portion or portions of the genome of the target subject determined to be part of the Accessible Data when receiving the input command therefor;

displaying the decrypted portion or portions of the genome of the target subject of the Accessible Data via the GUI;

blocking decryption of the Confidential Data when receiving the input command therefor; and displaying via the GUI an indication that decryption is blocked when receiving the input command for decryption of the Confidential Data.

2. The computer implemented system according to claim 1, wherein the real time computer implementable steps further comprise: blocking any further input commands via the input interface and/or blocking the GUI following a predetermined threshold of input commands for decrypting the Confidential Data.

3. The computer implemented system according to claim 1, wherein the system further comprises a monitoring user device comprising a monitoring user device controller with an associated memory, a monitoring input interface, and a monitoring display interface for displaying a monitoring user interface (mGUI), the real time computer implementable steps further comprising: (i) displaying a message via the mGUI indicative of the received input command for decryption of the Confidential Data; (ii) prompting a target subject via the mGUI and following the displayed message in (i) to selectively input a command via the target subject input for: (i.1) establishing communication between the mGUI and the GUI; and/or (i.2) blocking any further input commands via the input interface and/or blocking the GUI; and (iii) executing the input command of (i.1) and/or (i.2) upon receipt thereof.

4. The computer implemented system according to claim 1, wherein the system further comprises a monitoring controller with an associated memory of processor executable code in operative communication with the system controller and/or the device controller, wherein execution of the processor executable code provides the monitoring controller to perform the computer implementable steps of: receiving a signal from the user device indicative of an input command for decrypting Confidential Data; responding to the indicative signal based on predetermined criteria stored in the memory of the monitoring controller, wherein responding comprises: inquiring by way of computer-generated communication with the user via the GUI the input command for decryption of the Confidential Data; determining based on user responses to the computer-generated inquiry in view of predetermined criteria stored in the memory of the monitoring controller whether decryption of the Confidential Data should proceed or not proceed; transmitting a signal to the system controller to allow the Confidential Data to be decrypted if it has been determined that the decryption should proceed or transmitting a signal to the system controller to continue to block decryption of the Confidential Data if it has been determined that decryption should not proceed.

5. The computer implemented system according to claim 4, wherein the monitoring controller further performs the computer implementable step of sending a security signal to the system controller when it has been determined that decryption of the Confidential Data should not proceed and based on predetermined security criteria stored in the memory of the monitoring controller wherein the security signal indicates to the system controller to execute a computer implementable security step.

6. The computer implemented system according to claim 1, wherein the real time computer implementable steps further comprise: blocking the encrypted genome or portions thereof of the target subject stored in the data storage medium from being copied on another data storage medium when receiving input commands therefor; and displaying a message that copying of the encrypted genome or portions thereof is blocked via the GUI when receiving a command therefor.

7. The computer implemented system according to claim 6, wherein the real time computer implementable steps further comprise: blocking any further input commands via the input interface and/or blocking the GUI following a predetermined threshold of input commands for copying of the encrypted genome or portions thereof.

8. The computer implemented system according to claim 6, wherein the system further comprises a monitoring user device comprising a monitoring controller with an associated memory, a monitoring input interface, and a monitoring display interface for displaying monitoring display graphical user interface (mGUI), the real time computer implementable steps further comprising: (i) displaying a message via the mGUI indicative of the received input command for copying the encrypted genome or portions thereof of the target subject on another storage medium; (ii) prompting a target subject via the mGUI and following the displayed message in (i) to selectively input a command via the target subject input for: (i.1) establishing communication between the mGUI and the GUI; and/or (i.2) blocking any further input commands via the input interface and/or blocking the GUI; and (iii) executing the input command of (i.1) and/or (i.2) upon receipt thereof.

9. The computer implemented system according to claim 1, wherein the system further comprises a monitoring controller with an associated memory of processor executable code in operative communication with the system controller and/or the device controller, wherein execution of the processor executable code provides the monitoring controller to perform the computer implementable steps of: receiving a signal from the user device indicative of an input command for copying the encrypted genome or portions thereof of the target subject stored in the data storage medium on another data storage medium; responding to the indicative signal based on predetermined criteria stored in the memory of the monitoring controller, wherein responding comprises: inquiring by way of computer-generated communication with the user via the GUI the input command for the copying; determining based on user responses to the computer-generated inquiry in view of predetermined criteria stored in the memory of the monitoring controller whether the copying should proceed or not proceed; transmitting a signal to the system controller to allow the copying to be executed if it has been determined that the copying should proceed or transmitting a signal to the system controller to block the copying from being executed if it has been determined that the copying should not proceed.

10. The computer implemented system according to claim 9, wherein the monitoring controller further performs the computer implementable step of sending a security signal to the system controller when it has been determined that the copying should not proceed and based on predetermined security criteria stored in the memory of the monitoring controller wherein the security signal indicates to the system controller to execute a computer implementable security step.

11. The computer implemented system according to claim 1, wherein the real time computer implementable steps further comprise: displaying via the GUI a graphical representation of the human genome of a target subject comprising visually identified accessible portion or portions thereof related to the Accessible Data and visually identified confidential portions or portions thereof related to the Confidential Data, wherein the input command for decryption of the Accessible Data comprises selecting via the GUI the visually identified accessible portion or portions.

12. The computer implementable system according to claim 11, wherein the input command for decryption of the Confidential Data comprises selecting via the GUI the visually identified confidential portion or portions.

13. The computer implementable system according to claim 1, wherein the real time computer implementable steps further comprise: prompting a user via the GUI to input a user identifier via the input interface in order for the system to identify the user based on a predetermined user list stored in the system memory; and monitoring user activity of the user.

14. The computer implementable system according to claim 1, wherein the real time computer implementable steps further comprise: providing for receiving an input command via the input interface regarding filtering criteria, wherein the filtering criteria comprises additional disease criteria, wherein the second ranking comprising the list of possible genetic diseases above the predetermined overall weight score threshold that include the additional disease characteristics.

15. A computer implementable system for managing genetic information associated with a human genome of a target subject and displayed via a graphical user interface (GUI), wherein the genetic information modulates the target subject's response to one or more therapeutic drugs when administered thereto, the system comprising:
 a user device comprising a device controller with an associated memory, an input interface, and a display interface for displaying the GUI;
 a data storage medium having stored therein an encrypted genome or portions thereof of the target subject;
 a database having stored therein: (a) a list of therapeutic drugs including a drug profile for each of the list of therapeutic drugs, (b) a list of genetic information that modulates a human response to one or more of the therapeutic drugs in the list thereof, wherein the genetic information comprises a list of genetic variants and combinations thereof, wherein the human response comprises a list of primary therapeutic effects and secondary effects for each of the therapeutic drugs in the list thereof, wherein the human response is also dependent to human profile data
 a system controller in communication with the user device and the database, the system controller having a processor with an associated memory of processor executable code for being executed by the system controller or for being downloaded into the memory of the user device controller to be executed thereby or to be executed synergistically by a combination of the system controller and the user device controller, wherein execution of the processor executable code by the system controller or by the user device controller or by the combination thereof synergistically provides for the system controller or the user device controller or the combination thereof with performing real time computer-implementable steps comprising:
  prompting a user via the GUI to input data related to candidate drugs for administration to the target subject via the input interface;
  acquiring human profile data related to the target subject;
  accessing the encrypted genome or portions thereof of the target subject stored in the data storage medium;
  searching the database by automatically comparing the candidate drugs with the list of therapeutic drugs in (a) in order to identify matches therebetween so as to provide a match between the list of genetic information in (b) and the candidate drug thereby identifying candidate genetic variants that will modulate the target subject's response to the candidate drugs;
  comparing the target subject genetic variants to the candidate genetic variants in order to identify matches therebetween so as to provide response modulating genetic variants of the target subject (Modulating Variants);
  determining the primary therapeutic effects and secondary effects modulated by the Modulating Variants for each of the candidate drugs based on the human profile data of the target subject;
  assigning weight scores to the determined primary therapeutic effect and secondary effects for each candidate drug based on the target subject's response to each of the candidate drugs as modulated by the Modulating Variants and additional predetermined criteria stored in the database;
  assigning an overall weight score to each of the candidate drugs based on the assigned weight scores of the determined primary therapeutic effects and secondary effects;
  ranking the candidate drugs based on the assigned overall weight scores;
  displaying via the GUI the ranking of the candidate drugs and a visual representation of a portion or portions of the genome of the target subject that are related to the Modulating Variants, wherein ranking of the candidate drugs are visually displayed to be differentiated in order of corresponding assigned overall weight score,
  providing for receiving an input command via the input interface for selective decryption of a portion or portions of the genome of the target subject;
  determining if the input command for selective decryption is for the portion or portions of the genome of the target subject that are related to the Modulated Variants of the ranked candidate drugs (Accessible Data) or that are not related to the Modulated Variants of the ranked candidate drugs (Confidential Data);
  decrypting the portion or portions of the genome of the target subject determined to be part of the Accessible Data when receiving the input command therefor;
  displaying the decrypted portion or portions of the genome of the target subject of the Accessible Data via the GUI;
  blocking decryption of the Confidential Data when receiving the input command therefor; and
  displaying via the GUI an indication that decryption is blocked when receiving the input command for decryption of the Confidential Data.

16. The computer implementable system according to claim 15, wherein the secondary effects comprise major secondary effects and minor secondary effects, wherein the computer implementable steps further comprise distinguishing between the major and minor secondary effects, wherein identification of a major secondary effect for a given one of the candidate drugs causes that given one of the candidate drugs to be removed from the ranking.

17. The computer implementable system according to claim 16, wherein the system further comprises a monitoring user device comprising a monitoring controller with an associated memory, a monitoring input interface, and a monitoring display interface for displaying monitoring display graphical user interface (mGUI), the realtime computer implementable steps further comprising: communicating the minor secondary effects via the mGUI; prompting via the mGUI for input commands via the input interface providing for selecting between desirable and undesirable minor secondary effects; wherein the assigning of weight scores to the secondary effects is based on the selected desirable and undesirable minor secondary effects.

18. A computer implementable system for managing genetic information associated with a human genome of a target subject and displayed via a graphical user interface (GUI), the system comprising:
- a user device comprising a device controller with an associated memory, an input interface, and a display interface for displaying the GUI;
- a data storage medium having stored therein an encrypted genome or portions thereof of the target subject (target genetic profile);
- a database having stored therein a plurality of patient profiles, wherein each of the patient profiles comprising a clinical profile and a genetic profile;
- a system controller in communication with the user device and the database, the system controller having a processor with an associated memory of processor executable code for being executed by the system controller or for being downloaded into the memory of the user device controller to be executed thereby or to be executed synergistically by a combination of the system controller and the user device controller, wherein execution of the processor executable code by the system controller or by the user device controller or by the combination thereof synergistically provides for the system controller or the user device controller or the combination thereof with performing real time computer-implementable steps comprising:
  - prompting a user via the GUI to input data related to a target clinical profile of target of the target subject via the input interface;
  - acquiring the input data related to the target clinical profile;
  - accessing the encrypted genome or portions thereof of the target subject stored in the data storage medium;
  - automatically comparing the target clinical profile with the clinical profile of the patients stored in the database in order to provide first clusters of the patient clinical profiles that have a degree of similarity above a predetermined threshold with the target clinical profile, each of the first clusters having respective clinical profiles of the patients with a degree of similarity therebetween, each of the first clusters being ranked (first ranking) according to their degree of similarity with the target clinical profile;
  - automatically comparing the target genetic profile to the genetic profiles of the patients stored in the database in order to provide second clusters of the patient genetic profiles within the first clusters that have a degree of similarity above a predetermined threshold with the target genetic profile, each of the second clusters having respective genetic profiles of the patients with a degree of similarity therebetween, each of the second clusters being ranked (second ranking) according to their degree of similarity with the target genetic profile, each of the second clusters being related to a portion or portions of the genome of the target subject;
  - displaying via the GUI the second clusters and/or a visual representation of the portion or portions of the genome of the target subject related to the second clusters, wherein the second ranking is visually displayed to be differentiated, wherein the visual representation of the portion or portions of the genome of the target subject that are related to the second ranking are visually displayed in ranking order,
  - providing for receiving an input command via the input interface for selective decryption of a portion or portions of the genome of the target subject;
  - determining if the input command for selective decryption is for the portion or portions of the genome of the target subject that are related to the second clusters (Accessible Data) or that are not related to the second clusters (Confidential Data);
  - decrypting the portion or portions of the genome of the target subject determined to be part of the Accessible Data when receiving the input command therefor;
  - displaying the decrypted portion or portions of the genome of the target subject of the Accessible Data via the GUI;
  - blocking decryption of the Confidential Data when receiving the input command therefor; and
  - displaying via the GUI an indication that decryption is blocked when receiving the input command for decryption of the Confidential Data.

19. The computer implementable system according to claim 18, wherein the second clusters are related to respective candidate diseases.

20. The computer implementable system according to claim 18, wherein the second clusters are related to respective candidate therapeutic drugs.

* * * * *